US012592786B2

(12) United States Patent
Alriksson et al.

(10) Patent No.: US 12,592,786 B2
(45) Date of Patent: Mar. 31, 2026

(54) NETWORK NODE, USER EQUIPMENT AND METHODS IN A RADIO ACCESS NETWORK

(71) Applicant: Telefonaktiebolaget LM Ericsson (publ), Stockholm (SE)

(72) Inventors: Peter Alriksson, Hörby (SE); Emma Wittenmark, Lund (SE); Stephen Grant, Pleasanton, CA (US); Havish Koorapaty, Saratoga, CA (US); Reem Karaki, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 409 days.

(21) Appl. No.: 18/250,389

(22) PCT Filed: Oct. 21, 2021

(86) PCT No.: PCT/SE2021/051053
§ 371 (c)(1),
(2) Date: Apr. 25, 2023

(87) PCT Pub. No.: WO2022/093097
PCT Pub. Date: May 5, 2022

(65) Prior Publication Data
US 2024/0007206 A1     Jan. 4, 2024

Related U.S. Application Data

(60) Provisional application No. 63/106,326, filed on Oct. 27, 2020.

(51) Int. Cl.
*H04B 17/318*     (2015.01)
*H04B 7/06*     (2006.01)
*H04W 16/28*     (2009.01)

(52) U.S. Cl.
CPC ......... *H04B 17/328* (2023.05); *H04B 7/0626* (2013.01); *H04W 16/28* (2013.01)

(58) Field of Classification Search
CPC .... H04B 17/328; H04B 7/0626; H04W 16/28
See application file for complete search history.

(56) References Cited

U.S. PATENT DOCUMENTS

2019/0334603 A1* 10/2019 Venugopal ........... H04B 7/0632
2020/0120665 A1* 4/2020 Jin .......................... H04L 45/74
(Continued)

FOREIGN PATENT DOCUMENTS

WO     WO-2021011442 A1 * 1/2021 ............ H04W 72/23

OTHER PUBLICATIONS

3GPP TSG RAN WG1 Ad-Hoc Meeting 1901, R1-1900489, Jan. 21-Jan. 25, 2019 (Year: 2019).*
(Continued)

*Primary Examiner* — Deepa Belur
(74) *Attorney, Agent, or Firm* — Weisberg I.P. Law, P.A.

(57) ABSTRACT

A method of measuring a received signal strength by a radio device in a radio access network, RAN, is provided. The radio device obtains a radio resource information indicative of a spatial domain of a radio resource for measuring the received signal strength. The spatial domain of the radio resource corresponds to a combination of antenna elements in the radio device according to a spatial domain filter. The radio device measures the received signal strength on the radio resource in the spatial domain according to the obtained radio resource information. The radio device transmits a report to the RAN, the report being indicative of the received signal strength. The received signal strength includes a received signal strength indicator, RSSI.

19 Claims, 8 Drawing Sheets

300

Obtain a radio resource information indicative of a spatial domain of a radio resource for measuring the received signal strength, the spatial domain of the radio resource corresponds to a combination of antenna elements in the radio device according to a spatial domain filter. ⟍— 302

Measure the received signal strength on the radio resource in the spatial domain according to the obtained radio resource information. ⟍— 304

Transmit report to RAN, the report being indicative of the received signal strength, the signal strength comprises a received signal strength indicator. ⟍— 308

(56)           References Cited

U.S. PATENT DOCUMENTS

| | | | |
|---|---|---|---|
| 2021/0067225 A1* | 3/2021 | Mo | H04B 7/0639 |
| 2021/0112500 A1* | 4/2021 | Takeda | H04L 1/1854 |
| 2023/0123975 A1* | 4/2023 | Zhang | H04B 7/088 |
| | | | 370/329 |

OTHER PUBLICATIONS

International Search Report and Written Opinion dated Jan. 28, 2022 for International Application No. PCT/SE2021/051053 filed Oct. 21, 2021, consisting of 11-pages.

3GPP TSG RAN WG1 Ad-Hoc Meeting 1901 R1-1900489; Title: UE-to-UE CLI measurement and reporting; Agenda Item: 7.2.5.1; Source: Intel Corporation; Document for: Discussion and decision; Date and Location: Jan. 21-25, 2019, Taipei, China, consisting of 5-pages.

3GPP TSG RAN WG1 Meeting Ad-Hoc Meeting 1901 R1-1900758; Title: On UE-side cross-link interference measurement and reporting; Agenda Item: 7.2.5.1; Source: Ericsson; Document for: Discussion and Decision; Date and Location: Jan. 21-25, 2019, Taipei, Taiwan, consisting of 10-pages.

3GPP TSG RAN WG4 Meeting #91 R1-1906885; Title: Considerations on RSSI measurements for CLI; Agenda Item: 8.2.3; Source: Ericsson; Document for: Approval; Date and Location: May 13-17, 2019, Reno, Nevada, consisting of 3-pages.

ETSI TS 136 331 V16.2.1; Technical Specification; LTE; Evolved Universal Terrestrial Radio Access (E-UTRA); Radio Resource Control (RRC); Protocol specification (3GPP TS 36.331 version 16.2.1 Release 16); Nov. 2020, consisting of 1086-pages.

ETSI TS 138 214 V16.3.0; Technical Specification; 5G; NR; Physical layer procedures for data (3GPP TS 38.214 version 16.3.0 Release 16); Nov. 2020, consisting of 169-pages.

ETSI TS 138 215 V16.3.0; Technical Specification; 5G; NR; Physical layer measurements (3GPP TS 38.215 version 16.3.0 Release 16); Nov. 2020, consisting of 31-pages.

ETSI TS 138 331 V16.2.0; Technical Specification; 5G; NR; Radio Resource Control (RRC); Protocol specification (3GPP TS 38.331 version 16.2.0 Release 16); Nov. 2020, consisting of 908-pages.

ETSI TS 137 213 V16.2.0; Technical Specification; LTE; 5G; NR; Physical layer procedures for shared spectrum channel access (3GPP TS 37.213 version 16.2.0 Release 16); Jul. 2020, consisting of 28-pages.

* cited by examiner

<u>100</u>

Obtaining Module —— 102

Measuring Module —— 104

<u>200</u>

Providing Module —— 202

Receiving Module —— 208

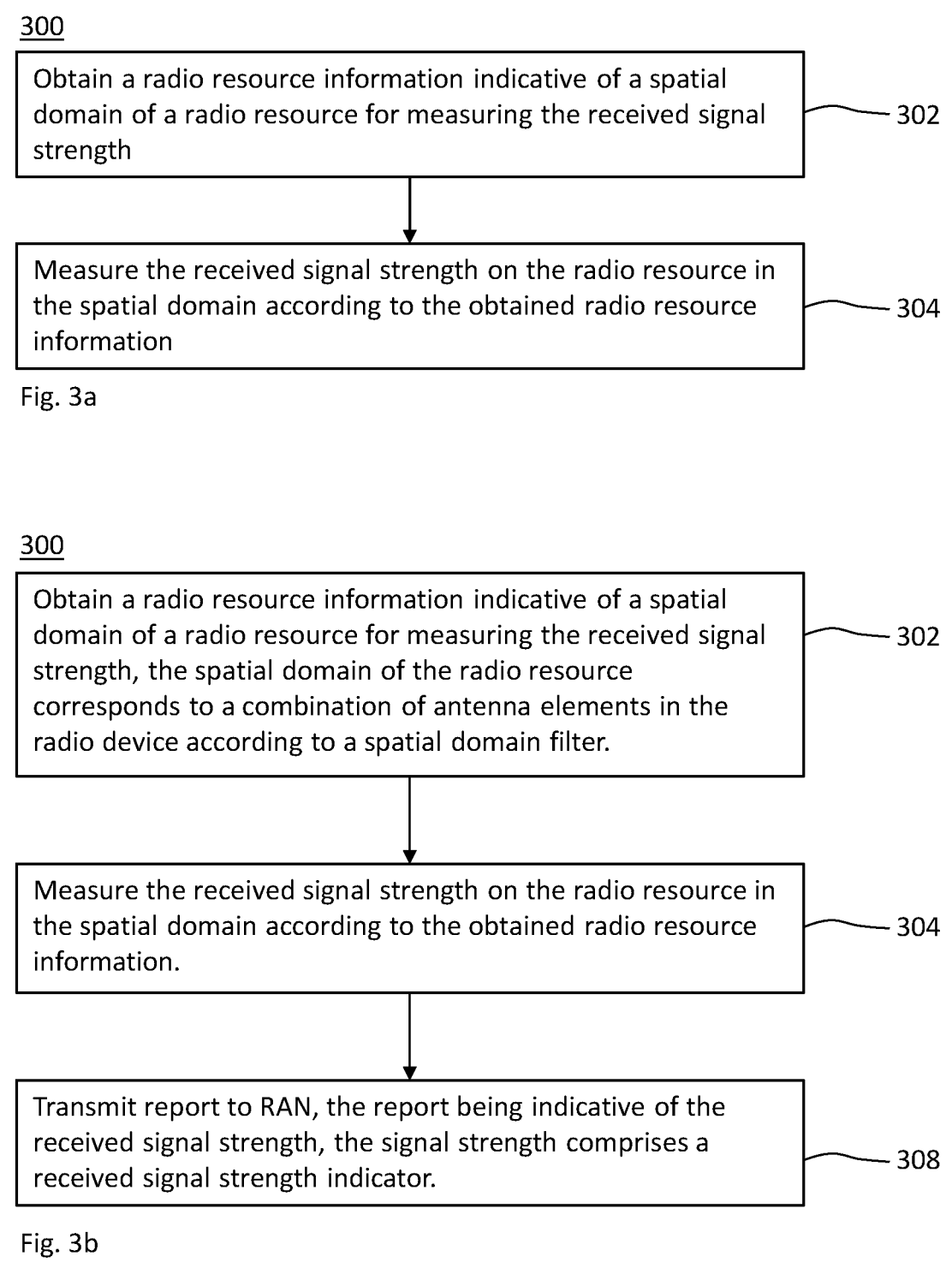

300

| Obtain a radio resource information indicative of a spatial domain of a radio resource for measuring the received signal strength | — 302 |

| Measure the received signal strength on the radio resource in the spatial domain according to the obtained radio resource information | — 304 |

| Obtain a radio resource information indicative of a spatial domain of a radio resource for measuring the received signal strength, the spatial domain of the radio resource corresponds to a combination of antenna elements in the radio device according to a spatial domain filter. | — 302 |

| Measure the received signal strength on the radio resource in the spatial domain according to the obtained radio resource information. | — 304 |

| Transmit report to RAN, the report being indicative of the received signal strength, the signal strength comprises a received signal strength indicator. | — 308 |

Fig. 3b

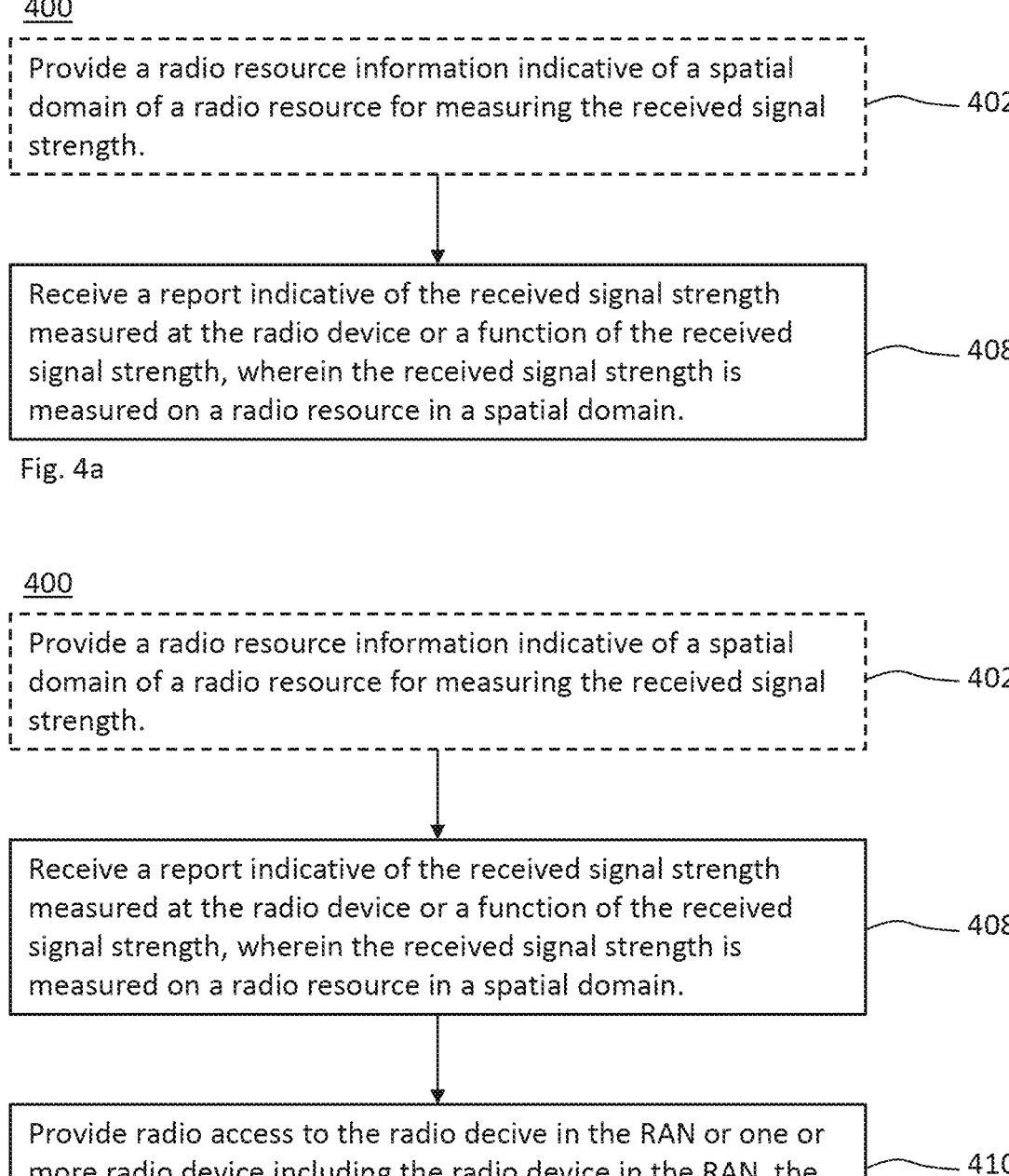

400

Provide a radio resource information indicative of a spatial domain of a radio resource for measuring the received signal strength. — 402

Receive a report indicative of the received signal strength measured at the radio device or a function of the received signal strength, wherein the received signal strength is measured on a radio resource in a spatial domain. — 408

Provide a radio resource information indicative of a spatial domain of a radio resource for measuring the received signal strength. — 402

Receive a report indicative of the received signal strength measured at the radio device or a function of the received signal strength, wherein the received signal strength is measured on a radio resource in a spatial domain. — 408

Provide radio access to the radio decive in the RAN or one or more radio device including the radio device in the RAN, the radio access is provided based on the received report. — 410

NETWORK NODE, USER EQUIPMENT AND METHODS IN A RADIO ACCESS NETWORK

CROSS-REFERENCE TO RELATED APPLICATIONS

This application is a Submission Under 35 U.S.C. § 371 for U.S. National Stage Patent Application of International Application No.: PCT/SE2021/051053, filed Oct. 21, 2021 entitled "NETWORK NODE, USER EQUIPMENT AND METHODS IN A RADIO ACCESS NETWORK," which claims priority to U.S. Provisional Application No. 63/106, 326, filed Oct. 27, 2020, entitled "TECHNIQUE FOR MEASURING A RECEIVED SIGNAL STRENGTH," the entireties of both of which are incorporated herein by reference.

TECHNICAL FIELD

Embodiments herein relate to a radio access network, network node, a radio device and methods therein. In some aspects, they relate to measuring a received signal strength by a radio device in a radio access network.

The present disclosure relates to a technique for measuring a received signal strength. More specifically, and without limitation, methods and devices are provided for measuring and receiving a received signal strength measured by a radio device in a radio access network.

BACKGROUND

Mobile broadband, e.g., as specified by the Third Generation Partnership Project 3 GPP, continues to fulfill, and drive the demands for higher overall traffic capacity and higher achievable end-user data rates in the wireless access network. Several scenarios in the future will require data rates of up to 10 Gbps in local areas. These demands for very high system capacity and very high end-user data rates may be met by networks with distances between access nodes ranging from a few meters in indoor deployments up to roughly 50 m in outdoor deployments, i.e. with an infrastructure density considerably higher than the densest networks of today. The wide transmission bandwidths needed to provide data rates up to 10 Gbps and above may likely only be obtained from spectrum allocations in the millimeter-wave band. High-gain beamforming, typically realized with array antennas, may be used to mitigate the increased pathloss at higher frequencies.

Herein, such networks are referred to as New Radio (NR) systems in the following. A corresponding radio access technology is referred to as Fifth Generation NR (5 G NR).

3 GPP NR supports a diverse set of use cases and a diverse set of deployment scenarios. The latter includes deployment at both low frequencies (e.g., hundreds of MHz), and very high frequencies (mm waves in the tens of GHz). Two operation frequency ranges (FR) are defined in 3 GPP NR Release 15: FR1 from 410 MHz to 7125 MHz and FR2 from 24.250 GHz to 52.6 GHz. 3 GPP RAN is currently working on a study item for NR Release 17 on supporting NR operation from 52.6 GHz to 71 GHz.

In 3 GPP Release 16 NR, a measurement of a received signal strength indicator (RSSI) is only defined for FR1. A cross-link interference RSSI (CLI-RSSI) measurement is defined for FR2, as the combined signal from antenna elements corresponding to a given receiver branch. When operating at high frequencies the measured RSSI is very directional-dependent. Thus, it is important that the measurement has a well-defined direction at a measuring radio device.

SUMMARY

Accordingly, there is a need for a technique that allows measurements of a received signal strength in a mm-wave band and/or in unlicensed spectrum. Alternatively or in addition, there is a need for a technique that allows the measurement of a received signal strength in a well-defined direction at a radio device and/or using a well-defined combination of antenna elements at the radio device. Alternatively or in addition, there is a need for a technique that ensures that a measuring radio device and a radio access network have consistent knowledge of the direction of the measurement of a received signal strength, preferably without increasing a signaling overhead for the measurements.

According to an aspect of embodiments herein, a method of measuring a received signal strength by a radio device in a radio access network, RAN, is provided.

The radio device obtains a radio resource information indicative of a spatial domain of a radio resource for measuring the received signal strength. The spatial domain of the radio resource corresponds to a combination of antenna elements in the radio device according to a spatial domain filter.

The radio device measures the received signal strength on the radio resource in the spatial domain according to the obtained radio resource information.

The radio device transmits a report to the RAN. The report being indicative of the received signal strength. The received signal strength comprises a received signal strength indicator, RSSI.

According to another aspect of embodiments herein, a method of receiving a received signal strength measured by a radio device in a radio access network, RAN, is provided.

The RAN receives a report indicative of the received signal strength measured at the radio device. The received signal strength is measured on a radio resource in the spatial domain. The received signal strength comprises a received signal strength indicator, RSSI.

The RAN provides radio access to the radio device in the RAN or one or more radio devices including the radio device in the RAN. The radio access is provided based the received report.

According to another aspect of embodiments herein, a radio device for measuring a received signal strength by the radio device in a radio access network, RAN, is provided. The radio device being configure to:

obtain a radio resource information indicative of a spatial domain of a radio resource for measuring a received signal strength, wherein the spatial domain of the radio resource is adapted to correspond to a combination of antenna elements in the radio device according to a spatial domain filter; and measure the received signal strength on the radio resource in the spatial domain according to the obtained radio resource information.

transmit a report to the RAN, the report adapted to be indicative of the received signal strength, wherein the received signal strength is adapted to comprise a received signal strength indicator, RSSI.

According to another aspect of embodiments herein, a network node for receiving a received signal strength measured by a radio device in a radio access network, RAN, is provided. The network node configured to:

receive a report indicative of the received signal strength measured at the radio device, wherein the received signal strength is measured on a radio resource in a spatial domain, wherein the received signal strength is adapted to comprise a received signal strength indicator, RSSI, and provide radio access to the radio device in the RAN or one or more radio devices including the radio device in the RAN, wherein the radio access is adapted to be provided based the received report

BRIEF DESCRIPTION OF DRAWINGS

Further details of embodiments of the technique are described with reference to the enclosed drawings, wherein:

FIG. 3a shows a flowchart for a method of measuring a received signal strength, which method may be implementable by the device of FIG. 1;

FIG. 3b shows a flowchart for a method of measuring a received signal strength, which method may be implementable by the device of FIG. 1;

FIG. 4a shows a flowchart for a method of receiving a received signal strength, which method may be implementable by the device of FIG. 2;

FIG. 4b shows a flowchart for a method of receiving a received signal strength, which method may be implementable by the device of FIG. 2;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the 15 following embodiments are primarily described for a New Radio (NR) or 5 G implementation, it is readily apparent that the technique described herein may also be implemented for any other radio communication technique, including a Wireless Local Area Network (WLAN) implementation according to the standard family IEEE 802.11, 3 GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, they may also be embodied in a computer program product as well as in a system comprising at least one computer processor and memory coupled to the at least one processor, wherein the memory is encoded with one or more programs that may perform the functions and steps or implement the units and modules disclosed herein.

Figures 1, 2:
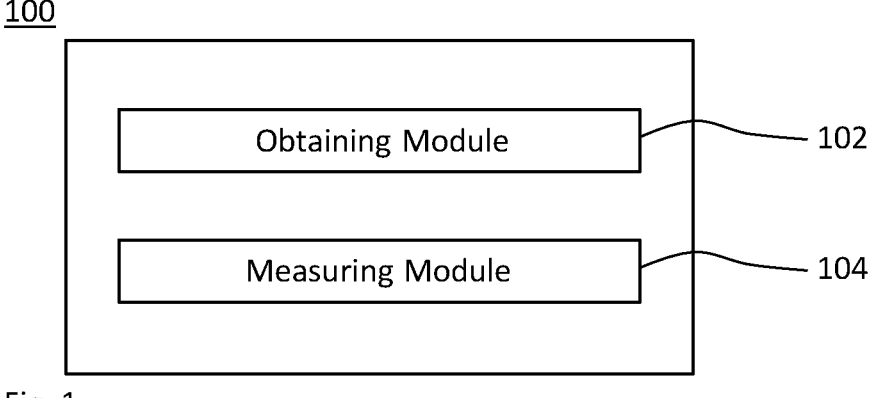
FIG. 1 shows a schematic block diagram of an embodiment of a device for measuring a received signal strength.
FIG. 2 shows a schematic block diagram of an embodiment of a device for measuring a received signal strength.

FIG. 1 schematically illustrates an example block diagram of a device according to the first device aspect, e.g. the radio device 100. The device is generically referred to by reference sign 100.

The device 100 may comprise any one of an obtaining module 102 and an measuring module 104 for performing the steps labelled 302 and 304, respectively, preferably according to the list of embodiments or any embodiment disclosed herein.

Any of the modules of the device 100 may be implemented by units configured to provide the corresponding functionality.

The device 100 may also be referred to as, or may be embodied by, the radio device, e.g. the radio device 100. The device 100 and any other network node (e.g., a base station of the RAN) may be in a radio communication (preferably using the 3GPP interface Uu).

FIG. 2 schematically illustrates an example block diagram of a device according to the second device aspect, e.g. the network node 200. The device is generically referred to by reference sign 200.

The device 200 may comprise any one of an optional providing module 202 and a receiving module 208 for performing the steps labelled 402 and 408, respectively, preferably according to the list of embodiments or any embodiment disclosed herein.

Any of the modules of the device 200 may be implemented by units configured to provide the corresponding functionality.

The device 200 may also be referred to as, or may be embodied by, the RAN or a network node of the RAN (e.g., the network node serving the radio device). The device 200 and any radio device may be in a radio communication (preferably using the 3GPP interface Uu).

The technique may be applied to uplink (UL), downlink (DL) or direct communications between radio devices, e.g., device-to-device (D2D) communications or sidelink (SL) communications.

Herein, any radio device may be a mobile or portable station and/or any radio device wirelessly connectable to the network node (e.g., a base station) and/or the RAN, or to another radio device. A radio device may be a user equipment (UE), a device for machine-type communication (MTC) or a device for (e.g., narrowband) Internet of Things (IOT). Two or more radio devices may be configured to wirelessly connect to each other, e.g., in an ad hoc radio network or via a 3GPP sidelink connection. Furthermore, any base station may be a station providing radio access, may be part of a radio access network (RAN) and/or may be a node connected to the RAN for controlling radio access. Further a base station may be an access point, for example a Wi-Fi access point.

FIG. 3 shows an example flowchart for a method 300 according to an aspect of embodiments, e.g. the first method aspect in the list of embodiments, such as the method 300 of measuring a received signal strength by the radio device in the RAN. The method 300 may be performed by the device 100, such as e.g. the radio device 100. For example, the modules 102 and 104 may perform the steps 302 and 304, respectively. The method 300 comprises or initiates the steps:

Step 302

The radio device may need to know radio resource information when performing measurements.

The radio device obtains a radio resource information indicative of a spatial domain of a radio resource for measuring the received signal strength. The spatial domain of the radio resource corresponds to a combination of antenna elements in the radio device according to a spatial domain filter.

The term time resource used herein may correspond to any type of physical resource or radio resource expressed in terms of length of time or time interval or time duration. Examples of time resources are: symbol, mini-slot, time slot, subframe, radio frame, TTI, interleaving time, etc.

The radio resource information may be obtained at the radio device. The step of obtaining may comprise receiving, deriving and/or determining the radio resource information. Obtaining the radio resource information may be referred to, or may be part of, a configuration of the radio device.

In some embodiments, obtaining of the radio resource information indicative of the spatial domain comprises implicitly receiving the radio resource information from the RAN, optionally from a cell 502 or network node serving the radio device 100. Alternatively, or additionally, the radio resource information is obtained from a network node of the RAN. Alternatively, or additionally, the radio resource information is obtained from a network node of the RAN via unicast, dedicated signaling, multicast, or broadcast, optionally in system information, SI The spatial domain filter may also be referred to as a spatial precoder. The spatial domain filter may correspond to and/or may be implemented by a set of (e.g., receive and/or transmit) beamforming weights. The beamforming weights may also be referred to as antenna weighting factors.

In some embodiments, the radio resource information is further indicative of at least one of a time domain and a frequency domain of the radio resource for the measurement. The radio resource information may be received in one or more RRC messages. The one or more RRC messages may be indicative of at least one of a time domain and a frequency domain of the radio resource for the measurement. For example, the time domain may be configured by an RSSI measurement timing configuration (RMTC). The radio resource information may comprise an IE MeasObjectNR and/or a parameter RMTC-Config-r16, e.g., according to the 3GPP document TS 38.331, version 16.2.0. The radio device may setup the RMTC according to the 3GPP document TS 38.331, version 16.2.0, clause 5.5.2.10a.

In some embodiments, the radio device is served by the cell 502 or the network node of the RAN. The radio resource information is obtained by determining the spatial domain based on a reception from the cell 502 or network node.

Alternatively, or additionally, obtaining the radio resource information comprises determining the spatial domain of the radio resource for the measurement based on a reception of a reference signal of the RAN, optionally based on a reception of a synchronization signal block (SSB) and a channel state information reference signal (CSI-RS).

The spatial domain for the measurement of the received signal strength may be based on the reception from the cell or network node, e.g., the reception of a physical signal or reference signal from the cell or network node.

The SSB may comprise at least one of a synchronization signal (SS) and a physical broadcast channel (PBCH).

In some embodiments, the reception from the cell 502 or network node defines a spatial domain filter that is used by the radio device for both the reception from the cell 502 or network node and the measurement of the received signal strength.

In some embodiments, the radio device is served by the RAN according to a transmission configuration indicator (TCI). The TCI determines the spatial domain of the radio resource for the measurement.

The TCI may be an active configuration indicator for the physical downlink control channel (PDCCH).

The radio device may obtain the radio resource information by receiving any one or more out of:

one or more TCIs from the RAN, each of the one or more TCIs being indicative of the spatial domain for the measurement, and radio resource information for one or more radio link monitoring reference signals (RLM-RSs), from the RAN, each of the one or more RLM-RSs being indicative of the spatial domain for the measurement.

In other embodiments, the radio device obtains the radio resource information by any one or more out of:

receiving a plurality of TCIs from the RAN, and receiving radio resource information for a plurality of RLM-RSs from the RAN.

In some embodiments, the obtaining and the measurement, as described below, are performed in combination by determining the spatial domain, optionally the receiver beam, that corresponds to any one or more out of:

the highest received signal strength at the radio device, and the lowest received signal strength at the radio device, In some embodiments, the obtaining of the radio resource information comprises receiving radio resource information for at least one of channel measurement and interference measurement at the radio device.

The radio resource information may be a CSI resource setting and/or defined in accordance with the 3GPP document TS 38.214, version 16.3.0, Section 5.2.1.2.

Step 304

Based in the obtained radio resource information, the radio device may perform measurements.

The radio device 100 measures the received signal strength on the radio resource in the spatial domain according to the obtained radio resource information.

In some embodiments, the measurement comprises measuring the received signal strength in the spatial domain indicated by each of the plurality of TCIs.

In other embodiments, the measurement comprises measuring the received signal strength in the spatial domain indicated by each of the plurality of RLM-RSs.

In some embodiments, the channel measurement is based on channel state information reference signals (CSI-RSs) and/or the radio resource information is indicative of the radio resource for the CSI-RSs.

The interference measurement may be based on channel state information interference measurement (CSI-IM) resources and/or the radio resource information is indicative of the CSI-IM resources.

Step 308

In order for the RAN to gain information on the result of the measurements, the radio device reports it.

Thus, the radio device 100 transmits a report to the RAN, the report being indicative of the received signal strength. The received signal strength comprises an RSSI.

Throughout this disclosure the term RSSI is used, which includes both the RSSI and CLI-RSSI measurements and any other type of interference measurement. Further it includes any function of RSSI, for example channel occupancy.

The report may be indicative of at least one of the lowest received signal strength and the highest received signal strength at the radio device.

Alternatively, the report may be indicative of at least one of the received signal strength for each of the selected at least one spatial domain and an index, optionally an TCI state index, of the selected at least one spatial domain.

In some embodiments, the report comprises any one or more out of: A channel quality indicator (CQI) based on the channel measurement and the interference measurement, and the interference measurement. The interference measurement may be reported without combining in it with the channel measurement.

FIG. 4 shows an example flowchart for a method 400 according to an aspect of embodiments, e.g. the second method aspect in the list of embodiments, such as the method 400 of receiving a received signal strength measured by a radio device in the RAN. The method 400 may be performed by the device 200, such as e.g. the network node 200. For example, the modules 202 and 208 may perform the steps 402 and 408, respectively. The method 400 comprises or initiates the steps:

Step 402

In order to gain information on the conditions in the RAN, the RAN, e.g., the network node 200, may need to provide radio resource information related to measurements to be performed.

Therefore, in some embodiments, the RAN provides a radio resource information indicative of a spatial domain of a radio resource for measuring the received signal strength.

In some embodiments, the RAN serves the radio device, e.g. the radio device 100, according to one or more TCIs. At least one or each of the one or more TCIs determines the spatial domain of the radio resource for the measurement at the radio device.

The RAN may transmit one or more reference signals. At least one or each of the one or more reference signals determines the spatial domain of the radio resource for the measurement at the radio device, e.g. the radio device 100.

Step 408

Results on measurements performed in the RAN, e.g., by the radio device 100, is reported to the RAN, e.g., the network node 200.

The RAN receives a report indicative of the received signal strength measured at the radio device 100. The received signal strength is measured on a radio resource in the spatial domain. The received signal strength comprises an RSSI.

Step 410

The received report may assist the RAN to provide radio access to radio devices in the RAN.

The RAN provides radio access to the radio device 100 in the RAN or one or more radio devices including the radio device 100 in the RAN. The radio access is provided based the received report.

The technique may be applied to uplink (UL), downlink (DL) or direct communications between radio devices, e.g., device-to-device (D2D) communications or sidelink (SL) communications.

Each of the device 100 and device 200 may be a radio device and/or a base station. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IOT). Two or more radio devices may be configured to wirelessly connect to each other, e.g., in an ad hoc radio network or via a 3GPP SL connection.

Furthermore, any base station may be a station providing radio access, may be part of a radio access network (RAN) and/or may be a node connected to the RAN for controlling the radio access. For example, the base station may be an access point, for example a Wi-Fi access point.

Embodiments of the technique may full one or more of the objectives of a study item of 3GPP. 3GPP RAN is currently working on a study item for NR Release 17 on supporting NR operation from 52.6 GHz to 71 GHz (e.g., 3GPP document R1-2007038), which includes the following objectives:

(1) Study of required changes to NR using existing DL/UL NR waveform to support operation between 52.6 GHz and 71 GHz Study of applicable numerology including subcarrier spacing, channel BW (including maximum BW), and their impact to FR2 physical layer design to support system functionality considering practical RF impairments [RAN1, RAN4].

Identify potential critical problems to physical signal/channels, if any [RAN1].

(2) Study of channel access mechanism, considering potential interference to/from other nodes, assuming beam-based operation, in order to comply with the regulatory requirements applicable to unlicensed spectrum for frequencies between 52.6 GHz and 71 GHz [RAN1].

Note: It is clarified that potential interference impact, if identified, may require interference mitigation solutions as part of channel access mechanism.

Any of the embodiments may perform the measurement 304 as an RSSI measurements in LTE LAA and/or NR, e.g., comprising at least one of the following features. This is related to Action 304 described above.

In LTE, E-UTRA Received Signal Strength Indicator (RSSI) measurements were introduced for LAA and defined as the linear average of the total received power (in Watt) observed only in the configured OFDM symbols and in the measurement bandwidth over a pre-defined number of (e.g., 6) resource blocks, by the UE from all sources, including co-channel serving and non-serving cells, adjacent channel interference, thermal noise etc.

Higher layers, e.g., an radio resource control (RRC) layer, indicate an RSSI measurement timing configuration (RMTC), e.g., the measurement duration and which one or more OFDM symbols should be measured by the UE. Namely, the RSSI is configured, e.g., according to 3GPP document TS 36.331, version 16.2.1, by means of the following information element (IE) in MeasObjectEUTRA: rmtc-Period, rmtc-SubframeOffset, and measDuration. For example, the UE performs RSSI measurements during measDuration only within periodic RMTC occasions.

```
RMTC-Config-r13 ::= CHOICE {
    release                     NULL,
    setup                       SEQUENCE {
        rmtc-Period-r13         ENUMERATED {ms40, ms80,
    ms160, ms320, ms640},
        rmtc-SubframeOffset-r13  INTEGER(0..639)
        OPTIONAL,   -- Need ON
        measDuration-r13        ENUMERATED {sym1, sym14,
    sym28, sym42, sym70},
        ...
    }
}
``` rmtc-Period
Indicates the RSSI measurement timing configuration (RMTC) periodicity for this frequency. Value ms40 corresponds to 40 ms periodicity, ms80 corresponds to 80 ms periodicity and so on.
rmtc-SubframeOffset
Indicates the RSSI measurement timing configuration (RMTC) subframe offset for this frequency. The value of rmtc-SubframeOffset should be smaller than the value of rmtc-Period. For inter-frequency measurements, this field is optional present and if it is not configured, the UE chooses a random value as rmtc-SubframeOffset for measDuration which shall be selected to be between 0 and the configured rmtc-Period with equal probability.
measDuration
Number of consecutive symbols for which the Physical Layer reports samples of RSSI. Value sym1 corresponds to one symbol, sym14 corresponds to 14 symbols, and so on.

RSSI measurements are configured for a serving cell frequency or a neighbor cell frequency.

UE reports rssi-Result as the average of one or more sample values provided by lower layers (e.g., a physical layer, PHY layer, or a medium access control layer, MAC layer) in the reportInterval.

The reported values are in:

```
MeasResultForRSSI-r13 ::=SEQUENCE {
    rssi-Result-r13RSSI-Range-r13,
    channelOccupancy-r13INTEGER (0..100),
    ...
}
```

This framework was further extended in NR unlicensed (NR-U), e.g., according to 3GPP Release 16, to handle flexible sub-carrier spacing and center frequency of the measurements.

```
RMTC-Config-r16 ::=          SEQUENCE {
    rmtc-Periodicity-r16         ENUMERATED {ms40,
ms80, ms160, ms320, ms640},
    rmtc-SubframeOffset-r16      INTEGER(0..
OPTIONAL,  -- Need M
    measDurationSymbols-r16      ENUMERATED {sym1,
sym14or12, sym28or24, sym42or36, sym70or60},
    rmtc-Frequency-r16           ARFCN-ValueNR,
    ref-SCS-CP-r16               ENUMERATED {kHz15,
kHz30, kHz60-NCP, kHz60-ECP},
    ...
}
```

The RSSI measurement is defined as in 3GPP document TS 38.215, version 16.3.0:

| Definition | Received Signal Strength Indicator (RSSI), comprises the linear average of the total received power (in [W]) observed only per configured OFDM symbol and in the measurement bandwidth corresponding to the channel bandwidth defined in clause 4 of 3GPP document TS 37.213 (e.g., version 16.3.0), wherein the channel has the center frequency configured by ARFCN-valueNR, by the UE from all sources, including co-channel serving and non-serving cells, adjacent channel interference, thermal noise etc. Higher layers configure the ARFCN-valueNR, the reference numerology and the measurement duration, i.e., which OFDM symbol(s) should be measured by the UE. For frequency range 1, the reference point for the RSSI shall be the antenna connector of the UE. If receiver diversity is in use by the UE, the reported RSSI value shall not be lower than the corresponding RSSI of any of the individual receiver branches. |
|---|---|
| Applicable for | RRC_CONNECTED intra-frequency, RRC_CONNECTED inter-frequency |

Any of the embodiments may perform the measurement 304 as a channel occupancy measurement in LTE LAA and/or NR, e.g., comprising at least one of the following features. This is related to Action 304 described above.

The UE estimates the channel occupancy on one or more carrier frequencies indicated by higher layers, based on RSSI samples provided by the physical layer, according to the RSSI configuration. The channel occupancy is evaluated by comparing RSSI samples to the configured channelOccupancyThreshold.

The channel occupancy measurement period corresponds to max(reportInterval, rmtc-Period), UE reports the channelOccupancy as the rounded percentage of sample values which are beyond to the channelOccupancyThreshold within all the sample values in the reportInterval.

Any of the embodiments may perform the measurement 304 as a CLI-RSSI measurement in NR, e.g., comprising at least one of the following features. This is related to Action 304 described above.

In Release 16 another RSSI measurement, namely the cross-link interference (CLI) measurement was introduced. Similar as the RSSI measurement, the UE is configured with measurement resources.

```
RSSI-ResourceConfigCLI-r16 ::=    SEQUENCE {
    rssi-ResourceId-r16               RSSI-ResourceId-r16,
    rssi-SCS-r16                      SubcarrierSpacing,
    startPRB-r16                      INTEGER (0..2169),
    nrofPRBs-r16                      INTEGER
(4..maxNrofPhysicalResourceBlocksPlus1),
    startPosition-r16                 INTEGER (0..13),
    nrofSymbols-r16                   INTEGER (1..14),
```

-continued

```
rssi-PeriodicityAndOffset-r16        RSSI-
PeriodicityAndOffset-r16,
   refServCellIndex-r16              ServCellIndex
OPTIONAL,   -- Need S
   ...
}
```

The CLI-RSSI measurement is defined in the 3GPP document 38.215, version 16.3.0 as

| | |
|---|---|
| Definition | CLI Received Signal Strength Indicator (CLI-RSSI), is defined as linear average of the total received power (in [W]) observed only in the configured OFDM symbols of the configured measurement time resource(s), in the configured measurement bandwidth from all sources, including co-channel serving and non-serving cells, adjacent channel interference, thermal noise etc. For frequency range 1, the reference point for the RSSI shall be the antenna connector of the UE. For frequency range 2, CLI-RSSI shall be measured based on the combined signal from antenna elements corresponding to a given receiver branch. For frequency range 1 and 2, if receiver diversity is in use by the UE, the reported CLI-RSSI value shall not be lower than the corresponding CLI-RSSI of any of the individual receiver branches. |
| Applicable for | RRC_CONNECTED intra-frequency |

Any of the embodiments may perform the obtaining 302, the measurement 304 and/or transmit 308 using PDCCH TCI states in NR, e.g., comprising at least one of the following features. This is related to Actions 302, 304 and 308 described above.

A UE may be configured with a number of transmission configuration indicator (TCI) states. A TCI state (see below extract from 3GPP document TS 38.331, version 16.2.0) provides the UE with the ID of one or two reference signals, wherein each reference signal may be an SS/PBCH block or a channel state information reference signal (CSI-RS).

A quasi-co-location (QCL) type is associated with each of the reference signals of the TCI state, and the type may take one of 4 possible values: TypeA, TypeB, TypeC, or TypeD. A particular TCI state is indicated to the UE to aid in the reception of other signals/channels in the DL, e.g., PDSCH, PDCCH, other CSI-RS, etc. The indication of the TCI state to aid in reception of a DL signal is performed through either dynamic or semi-static signaling, i.e., via DCI, MAC-CE, or by RRC depending on the DL signal to be received. For example, for reception of PDCCH, a TCI state is indicated by MAC-CE signaling.

In the context of the embodiments herein, QCL TypeD is most relevant, and this QCL type is related to the spatial domain receiver settings in the UE, i.e., the setting of the spatial domain receive filter e.g. receive beamforming weights.

Hence, if TypeD is configured for one of the reference signals of the indicated TCI state for reception of a DL signal, e.g., PDCCH, it tells the UE that it may receive the PDCCH with the same spatial domain receiver settings as it used to receive the reference signal configured with TypeD within the TCI state. The implicit assumption is that the UE has previously performed measurements on this reference signal and "remembers" which spatial domain receiver settings it used for reception of that reference signal. In other words, the TCI state provides a means to indicate to the UE which receive beam to use for reception of the DL signal, e.g., PDCCH.

```
TCI-State ::=                    SEQUENCE {
   tci-StateId                   TCI -StateId,
   qcl-Type1                     QCL-Info,
   qcl-Type2                     QCL-Info
OPTIONAL,   -- Need R
   ...
}
QCL-Info ::=                     SEQUENCE {
   cell                          ServCellIndex
OPTIONAL,   -- Need R
   bwp-Id                        BWP-Id
OPTIONAL, -- Cond CSI-RS-Indicated
   referenceSignal               CHOICE {
      csi-rs                     NZP-CSI-RS-
ResourceId,
      ssb                        SSB-Index
   },
   qcl-Type                      ENUMERATED
{typeA, typeB, typeC, typeD},
   ...
}
```

| QCL-Info field descriptions |
|---|
| bwp-Id<br>The DL BWP which the RS is located in.<br>cell<br>The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See 3GPP document TS 38.214, version 16.3.0, clause 5.1.5.<br>referenceSignal<br>Reference signal with which quasi-collocation information is provided as specified in 3GPP document TS 38.214, version 16.3.0, clause 5.1.5. |

-continued

| QCL-Info field descriptions |
| --- |
| qcl-Type<br>QCL type as specified in 3GPP document TS 38.214, version 16.3.0, clause 5.1.5. |

| Conditional Presence | Explanation |
| --- | --- |
| CSI-RS-Indicated | This field is mandatory present if csi-rs is included, absent otherwise |

Herein, whenever referring to noise or a signal-to-noise ratio (SNR), a corresponding step, feature or effect is also disclosed for noise and/or interference or a signal-to-inter-ference-and-noise ratio (SINR).

In some embodiments a more general term "network node" is used and it may correspond to any type of radio network node or any network node, and may be referred to as network node 200, which communicates with a UE and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmis-sion points, transmission nodes, RRU, RRH, nodes in dis-tributed antenna system (DAS), core network node (e.g. MSC, MME, etc), O&M, OSS, SON, positioning node or location server (e.g. E-SMLC), MDT, test equipment such as e.g. physical node or software, etc. A radio network node is network node capable of transmitting radio signals, e.g., base station, gNB, etc.

In some embodiments the non-limiting term user equip-ment (UE) or wireless device is used and it refers to any type of wireless device, and may be referred to as radio device 100, communicating with a network node and/or with another UE in a cellular or mobile communication system. Examples of UE are wireless device supporting NR, target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), drone, USB dongles, ProSe UE, V2V UE, V2X UE, etc.

The term "radio node" may refer to radio network node or UE capable of transmitting radio signals or receiving radio signals or both.

As mentioned above, the term time resource used herein may correspond to any type of physical resource or radio resource expressed in terms of length of time or time interval or time duration. Examples of time resources are: symbol, mini-slot, time slot, subframe, radio frame, TTI, interleaving time, etc.

The term channel occupancy measurement used herein may comprise a measurement or evaluation result indicative of the occupancy of the associated resources. Some non-limiting examples of channel occupancy measurements are RSSI measurement or similar, channel occupancy evalua-tion result based on RSSI samples versus a configured threshold, percentage or ratio of RSSI samples meeting a certain condition, e.g., above a threshold, channel occu-pancy ratio, other measurement or metric based on RSSI samples, etc.

The embodiments are described for NR. However the embodiments are applicable to any other RAT or multi-RAT systems, where a UE receives and/or transmit signals (e.g. data) e.g. LTE FDD/TDD, LTE LAA and its enhancements, WCDMA/HSPA, Wi-Fi, WLAN, LTE, 5G, any NR (stand-alone or non-standalone), etc.

Throughout this disclosure we use the term RSSI which includes both the RSSI and CLI-RSSI measurements and any other type of interference measurement. Further it includes any function of RSSI, for example channel occu-pancy.

In the description we use the term beam. A beam may either be a receiver beam or a transmitter beam, depending on the context. A beam is associated with a specific way of combining signals from/to multiple antenna elements. The combining may be based on a particular setting of a (e.g., receive and/or transmit) spatial domain filter, or equivalently a set of (e.g., receive and/or transmit) beamforming weights, or equivalently (e.g., receive and/or transmit) antenna weighting factors.

Below embodiments will be categorized as being imple-mented in the UE, such as e.g., the radio device 100, and the gNB, such as e.g., the network node 200. This should be seen as the typical but not only partitioning. In general, there is a measuring device and a device receiving the measure-ment. In the description below, the UE, such as e.g., the radio device 100, acts as the measuring device and the gNB, such as e.g., the network node 200, as the one receiving and controlling how the measuring device should measure.

Any aspect may comprise the features of any one of the following embodiments, e.g. alone or in combination with any one of the embodiments in the list of embodiments. Without loss of generality, the radio device, such as e.g., the radio device 100, is referred to as a UE.

Particularly, the first aspect may comprise features of any one of the following embodiments, e.g., as methods in the UE 100, such as the radio device 100. The embodiments described herein may also be implemented in combination.

A first embodiment may use a receiver beam as the spatial domain, e.g., based on a currently active serving link receiver beam.

In the first embodiment, the UE 100, such as e.g., the radio device 100, uses the same receiver beam(s) for RSSI mea-surements as for the currently active PDCCH transmission configuration indicator (TCI) state(s) or selected SSB if no TCI state(s) for PDCCH is/are configured, e.g. in IDLE mode or during initial access. That is, the UE, such as e.g., the radio device 100, will receive interference from the same direction as it is currently receiving PDCCH for its serving link(s). This applies regardless of if the measurement is done on the same frequency resources as the serving cell or not. This way of operating may e.g. be indicated to the UE RMTC-Config and/or RSSI-ResourceConfigCLI. This e.g. allows the gNB, such as e.g., the network node 200, to gain information on the expected interference conditions on another frequency in the same direction as the UE, such as e.g., the radio device 100, is currently receiving.

A second embodiment may use a receiver beam as the spatial domain based on configured TCI state (e.g., a corresponding index).

In this embodiment the UE, such as e.g., the radio device 100, is explicitly indicated one or more TCI state indices corresponding to a plurality of configured TCI state(s) for the purposes of performing RSSI measurement. The UE, such as e.g., the radio device 100, then uses the same receiver beam for RSSI measurements corresponding to the indicated TCI states. In case of multiple TCI state indices, the UE, such as e.g., the radio device 100, may either report a list of RSSI values corresponding to each of the TCI state indices or it may report the RSSI and TCI state index of the one with the lowest RSSI (i.e. lowest interference). In a variant of this embodiment, the UE, such as e.g., the radio device 100, reports the RSSI with the highest L1-RSRP/RSSI ratio (equivalent to reference-signal receive quality (RSRQ)). The list of TCI state indices may be indicated to the UE, such as e.g., the radio device 100, in UE RMTC-Config and/or RSSI-ResourceConfigCLI.

In a variant of this embodiment, instead of configuring a TCI state index, a list of TCI states is explicitly configured for the purpose of RSSI measurements, in e.g. UE RMTC-Config and/or RSSI-ResourceConfigCLI.

This embodiment e.g. allows the gNB, such as e.g., the network node 200, to gain information on the interference conditions for different potential receiver directions.

A third embodiment uses a receiver beam as the spatial domain based on configured RLM-RS resources.

In this embodiment the UE, such as e.g., the radio device 100, is configured with one or more Radio Link Monitoring Reference Signal index (RLM-RS-Id). The UE, such as e.g., the radio device 100, then uses the same receiver beam for RSSI measurements as for reception of the indicated RLM-RS-Id (s).

In case of multiple RLM-RS index, the UE, such as e.g., the radio device 100, may either report a list of RSSI values corresponding to each of the RLM-RS index or it may report the RSSI and RLM-RS index of the one with the lowest RSSI (i.e. lowest interference). The list of RLM-RS index may be indicated to the UE, such as e.g., the radio device 100, in UE RMTC-Config and/or RSSI-ResourceConfigCLI.

A fourth embodiment uses a receiver beam as the spatial domain based on (neighbor) cell measurement results.

In this embodiment the UE, such as e.g., the radio device 100, reports RSSI based on the same receiver beam as used to measure and report for a specific cell (neighbor cell or serving cell). The cell ID (and corresponding measurement object ID) may be configured e.g. in UE RMTC-Config and/or RSSI-ResourceConfigCLI. In case no cell ID is configured the UE, such as e.g., the radio device 100, assumes that the reference is the (e.g., serving) cell on the configured frequency in the measurement object.

In case multiple RS (SSB and/or CSI-RS) are used to derive the cell measurement results as defined in 3GPP document TS 38.331, version 16.2.0, clause 5.5.3.3, RSSI should be measured based on the receiver beam corresponding to each of those RS and averaged accordingly. In another variant, the UE uses the RS with the highest measured quantality as a reference for RSSI measurement.

A fifth embodiment uses a receiver beam as the spatial domain based on (neighbor) cell RSRP per SSB/CSI-RS.

In this embodiment the UE, such as e.g., the radio device 100, reports RSSI based on the same receiver beam as used to measure and report for each specific RS (SSB or CSI-RS) for a specific cell (neighbor or serving cell). In one variant the measurement object is signaled and the UE, such as e.g., the radio device 100, measures and reports RSSI using the same receiver beams as each of the reported RS(s). In another variant the UE, such as e.g., the radio device 100, is configured to measure and report only for a subset of the RS. The cell ID, measurement object reference and list of RS may e.g. be configured in RMTC-Config and/or RSSI-ResourceConfigCLI.

A sixth embodiment determines, e.g., in the steps 302 and 304 and/or reports at least one of a maximum and/or a minimum-based receiver beam as the spatial domain.

In this embodiment the UE, such as e.g., the radio device 100, reports the RSSI based on the receiver beam that gives the highest/lowest RSSI measurement. In case the selected receiver beam corresponds to the same receiver beam as any configured TCI state, the UE, such as e.g., the radio device 100, may also report the corresponding TCI state index. The UE is configured to either use the highest or lowest or both, in which case two values will be reported.

A seventh embodiment obtains, measures and/or reports multi receiver beams as the spatial domains.

In case the UE, such as e.g., the radio device 100, is capable of simultaneous reception using multiple receiver beams (e.g. more than one panel with corresponding receiver or digital processing of antenna elements) for cases where more than one RSSI result is reported (as described in some of the other embodiments) the UE, such as e.g., the radio device 100, may explicitly indicate which of the results that were measured at the same time instant. Alternatively, if the gNB is aware of such capability of the UE, such as e.g., the radio device 100, e.g., through UE capability signaling, it may configure the UE, such as e.g., the radio device 100, to report two or more RSSI measurements, and the gNB, such as e.g., the network node 200, will understand that the results were measured simultaneously without explicit signaling from the UE, such as e.g., the radio device 100.

An eighth embodiment, e.g., of the UE 100 such as the radio device 100, obtains, measures and/or reports a selected receiver beam as the spatial domain.

In this embodiment the UE, such as e.g., the radio device 100, reports the RSSI based on a receiver beam based on its own selection. In case the selected receiver beam corresponds to the same receiver beam as any configured TCI state, the UE, such as e.g., the radio device 100, may also report the corresponding TCI state index.

A ninth embodiment uses the spatial domain as obtained 302 and/or the received signal strength as measured 304 on the PHY layer or L1 layer. The received signal strength or the function thereof may be referred to as L1-RSSI.

In Release 15 NR, for the purposes of channel state information (CSI) reporting, the UE is configured with resources for channel measurement and resources for interference measurement within a CSI-Resource setting (defined in 3GPP document TS 38.214, version 16.3.0, Section 5.2.1.2). The resources for the latter may be CSI interference measurement resources (CSI-IM) which are typically blanked/muted by the serving gNB, such as e.g., the network node 200, to allow the UE, such as e.g., the radio device 100, to measure interference from other sources. Alternatively, they may be non-zero power CSI-RS resources (NZP CSI-RS), in which case the UE, such as e.g., the radio device 100, would typically measure the received power on these resources and subtract that portion due to the serving gNB, thus leaving interference from other sources. In either case, when the UE, such as e.g., the radio device 100, reports CSI, it combines the measurement result based on the resources for channel measurement with the measurement result based on the resources for interference measurement into a single CSI value reflecting the channel quality, e.g., ratio of desired signal to interference. The reported value is a CQI value.

In this embodiment, the UE, such as e.g., the radio device 100, is configured to additionally report, or only report, an interference measurement (L1-RSSI) based on the measurement result obtained based on the resources for interference measurement without combining it with the measurement result based on the resources for channel measurement.

In a tenth embodiment, at least one of the obtaining 302, measurement 304, and the reporting 308 is scheduled and/or trigged.

The measurement 302 and/or the transmitting 308 of the report indicative of received signal strength, e.g., the RSSI and/or the channel occupancy, may be periodic and/or may be event-triggered. Alternatively or in addition, the RAN may configure the radio device, such as e.g., the radio device 100, e.g., the UE, to report periodically or event-trigged over RRC.

Alternatively or in addition, the report may be reported over RRC.

The L1-RSSI may be periodic or aperiodic, e.g., measured, and reported on PUCCH, PUSCH or as part of the UCI for configured grant PUSCH transmissions.

Particularly, the second aspect may comprise features of any one of the following embodiments, e.g., as methods in the radio network node 200.

The technique may comprises network node embodiments. The network node embodiments are as disclosed in the corresponding embodiments of the device 100, e.g., the UE 100, such as the radio device 100, particularly as description above.

For example, a network node may configure the UE 100, such as e.g., the radio device 100, according to one or more embodiments via unicast/dedicated signaling, multicast, or broadcast, e.g., in the system information.

Figure 5:
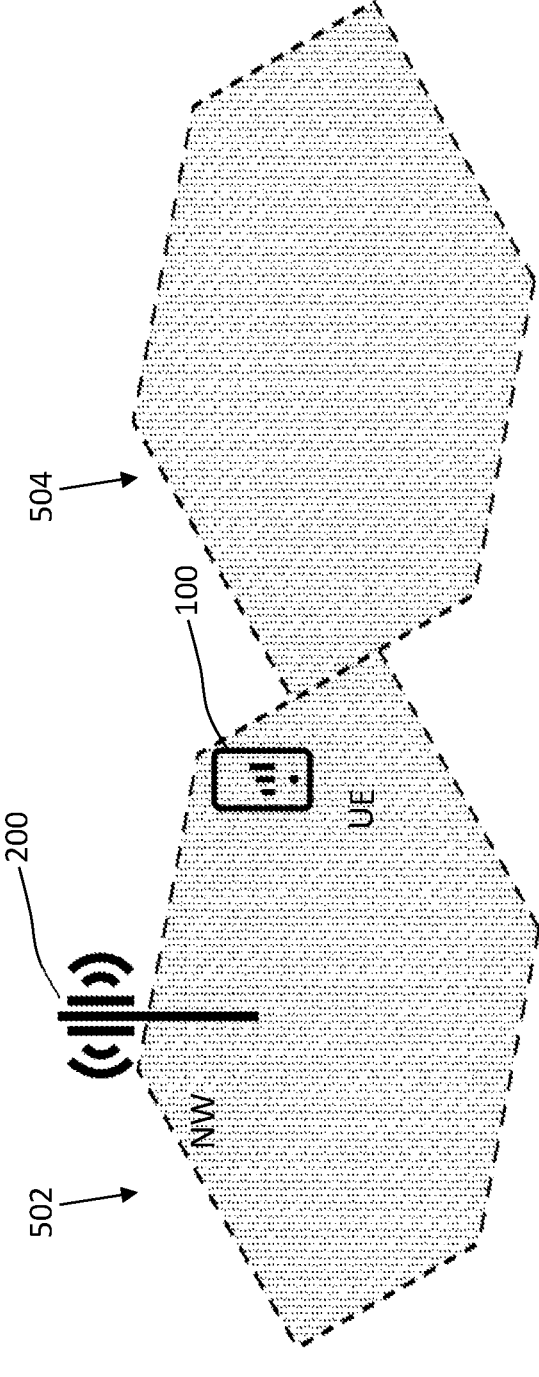
FIG. 5 schematically illustrates an example of a radio access network comprising embodiments of the devices of FIGS. 1 and 2.

FIG. 5 schematically illustrates an example of the RAN 500 comprising an embodiment of the network node 200 serving the radio device 100 in a serving cell 502, optionally subject to interference caused by a neighboring cell 504.

Figure 6:
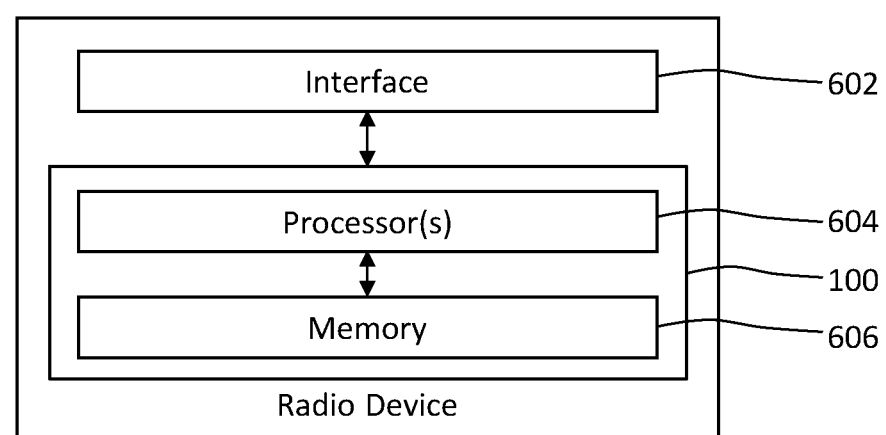
FIG. 6 shows a schematic block diagram of a radio device embodying the device of FIG. 1.

FIG. 6 shows a schematic block diagram for an embodiment of the device 100, such as e.g., the radio device 100. The device 100, such as e.g., the radio device 100, comprises processing circuitry, e.g., one or more processors 604 for performing the method 300 and memory 606 coupled to the processors 604. For example, the memory 606 may be encoded with instructions that implement at least one of the modules 102 and 104.

The one or more processors 604 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as e.g., the radio device 100, such as the memory 606, UE functionality. For example, the one or more processors 604 may execute instructions stored in the memory 606. Such functionality may include providing various features and steps discussed herein, including any of the benefits disclosed herein. The expression "the device being operative to perform an action" may denote the device 100, such as e.g., the radio device 100, being configured to perform the action.

As schematically illustrated in FIG. 6, the device 100, such as e.g., the radio device 100, may be embodied by a UE 600, e.g., functioning as the radio device 600. The radio device 600 comprises a radio interface 602 coupled to the device 100 for radio communication with one or more receiving stations, e.g., functioning as a base station or network node.

Figure 7:
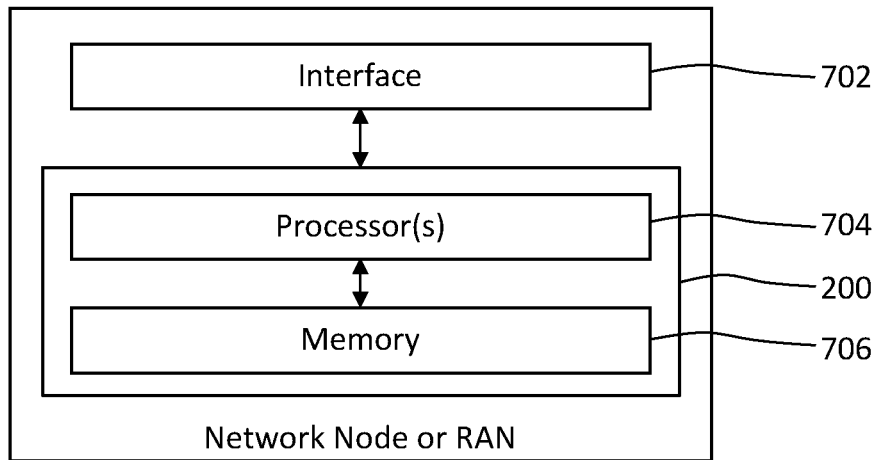
FIG. 7 shows a schematic block diagram of a network node or RAN embodying the device of FIG. 2.

FIG. 7 shows a schematic block diagram for an embodiment of the device 200, such as e.g., the network node 200. The device 200, such as e.g., the network node 200, comprises processing circuitry, e.g., one or more processors 704 for performing the method 400 and memory 706 coupled to the processors 704. For example, the memory 706 may be encoded with instructions that implement at least one of the modules 202 and 208.

The one or more processors 704 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as e.g., the network node 200, such as the memory 706, base station functionality. For example, the one or more processors 704 may execute instructions stored in the memory 706. Such functionality may include providing various features and steps discussed herein, including any of the benefits disclosed herein. The expression "the device being operative to perform an action" may denote the device 200, such as e.g., the network node 200, being configured to perform the action.

As schematically illustrated in FIG. 7, the device 200, such as e.g., the network node 200, may be embodied by a network node base station 700, e.g., functioning as a gNB or eNB or RAN. The network node 700 comprises a radio interface 702 coupled to the device 200, such as e.g., the network node 200, for radio communication with one or more UEs, e.g., functioning as a radio device 100.

Figure 8:
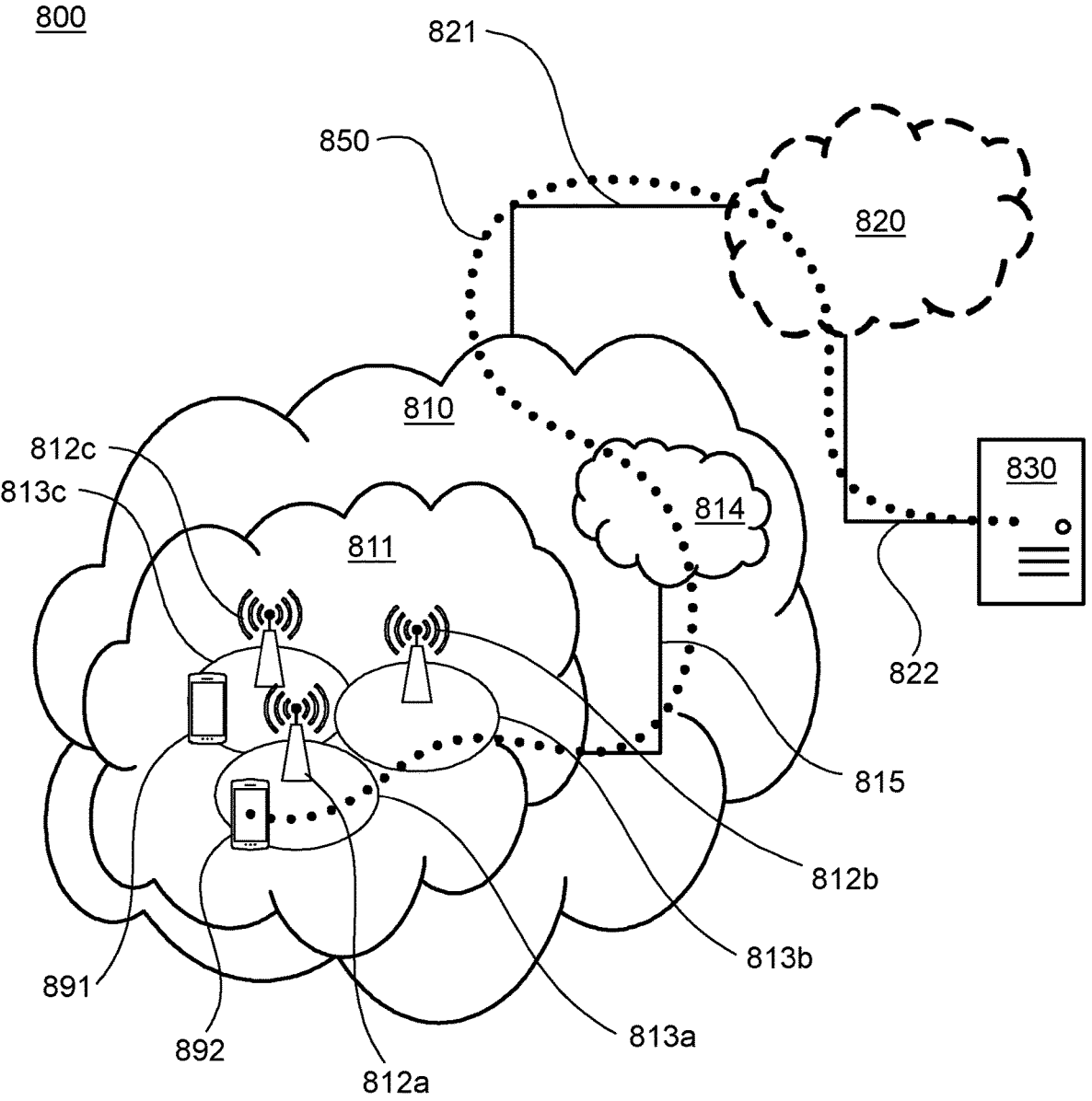
FIG. 8 schematically illustrates an example telecommunication network connected via an intermediate network to a host computer.

With reference to FIG. 8, in accordance with an embodiment, a communication system 800 includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first user equipment (UE) 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Any of the base stations 812 and the UEs 891, 892 may embody the device 100, such as e.g., the radio device 100.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. The connections 821, 822 between the telecommunication network 810 and the host computer 830 may extend directly from the core network 814 to the host computer 830 or may go via an optional intermediate network 820. The intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system 800 of FIG. 8 as a whole enables connectivity between one of the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, a base station 812 need not be informed about the past routing of an incoming downlink communication with data originating from a host computer 830 to be forwarded (e.g., handed over) to a connected UE 891. Similarly, the base station 812 need not be aware of the future routing of an outgoing uplink communication originating from the UE 891 towards the host computer 830.

By virtue of the method 300 or 400 being performed by any one of the UEs 891 or 892 and/or any one of the base stations 812, the performance or range of the OTT connection 850 may be improved, e.g., in terms of increased throughput and/or reduced latency. More specifically, the host computer 830 may indicate to the RAN 500 or the radio device 100 or the network node 200 (e.g., on an application layer) the QoS of the traffic which may trigger using the mm-wave band and/or the methods 300 and/or 400.

Example implementations, in accordance with an embodiment of the UE, base station and host computer discussed in the preceding paragraphs, will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as a UE 930 connecting via an OTT connection 950 terminating at the UE 930 and the host computer 910. In providing the service to the remote user, the host application 912 may provide user data, which is transmitted using the OTT connection 950. The user data may depend on the location of the UE 930. The user data may comprise auxiliary information or precision advertisements (also: ads) delivered to the UE 930. The location may be reported by the UE 930 to the host computer, e.g., using the OTT connection 950, and/or by the base station 920, e.g., using a connection 960.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with a UE 930 located in a coverage area (not shown in FIG. 9) served by the base station 920. The communication interface 926 may be configured to facilitate a connection 960 to the host computer 910. The connection 960 may be direct, or it may pass through a core network (not shown in FIG. 9) of the telecommunication system and/or through one or more intermediate networks outside the telecommunication system. In the embodiment shown, the hardware 925 of the base station 920 further includes processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
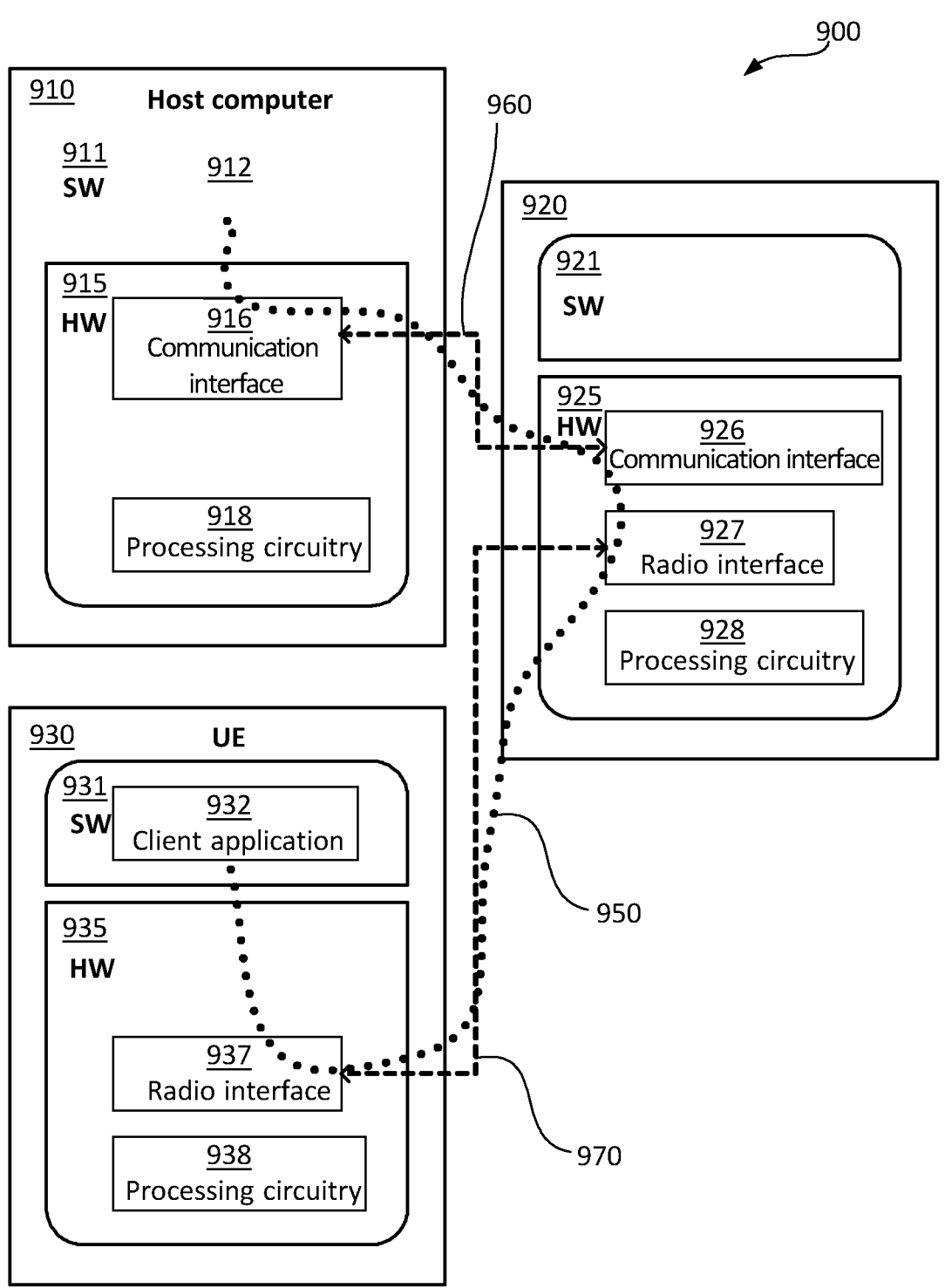
FIG. 9 shows a generalized block diagram of a host computer communicating via a base station or radio device functioning as a gateway with a user equipment over a partially wireless connection.

It is noted that the host computer 910, base station 920 and UE 930 illustrated in FIG. 9 may be identical to the host computer 830, one of the base stations 812a, 812b, 812c and one of the UEs 891, 892 of FIG. 8, respectively. This is to say, the inner workings of these entities may be as shown in FIG. 9, and, independently, the surrounding network topology may be that of FIG. 8.

In FIG. 9, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

The wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 950 between the host computer 910 and UE 930, in response to variations in the measurement results. The measurement procedure and/or the network functionality for reconfiguring the OTT connection 950 may be implemented in the software 911 of the host computer 910 or in the software 931 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer's 910 measurements of throughput, propagation times, latency and the like. The measurements may be implemented in that the software 911, 931 causes messages to be transmitted, in particular empty or "dummy" messages, using the OTT connection 950 while it monitors propagation times, errors etc.

Figures 10, 11:
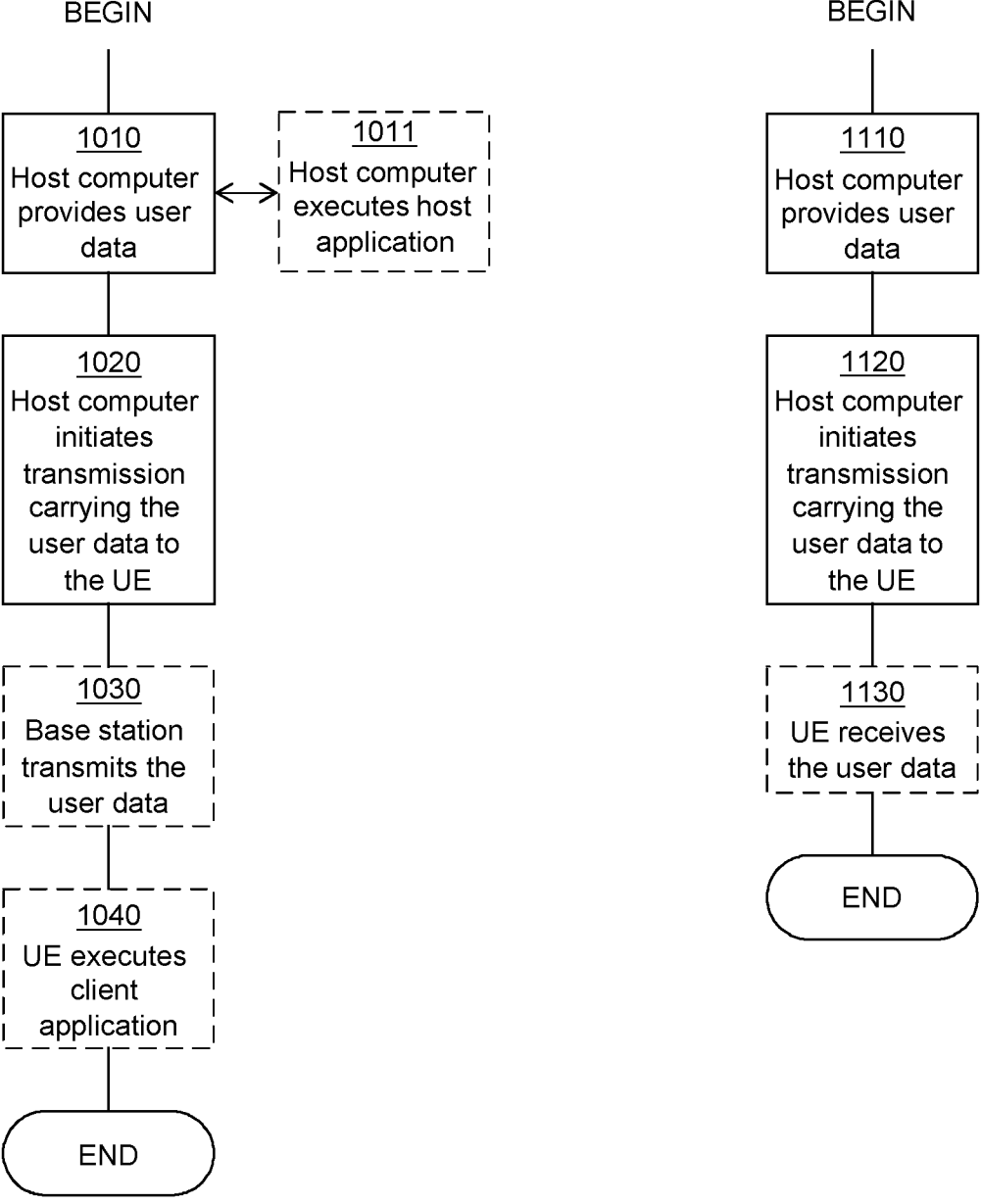
FIGS. 10 and 11 show flowcharts for methods implemented in a communication system including a host computer, a base station or radio device functioning as a gateway and a user equipment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this paragraph. In a first step 1010 of the method, the host computer provides user data. In an optional substep 1011 of the first step 1010, the host computer provides the user data by executing a host application. In a second step 1020, the host computer initiates a transmission carrying the user data to the UE. In an optional third step 1030, the base station transmits to the UE the user data which was carried in the transmission that the host computer initiated, in accordance with the teachings of the embodiments described throughout this disclosure. In an optional fourth step 1040, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this paragraph. In a first step 1110 of the method, the host computer provides user data. In an optional substep (not shown) the host computer provides the user data by executing a host application. In a second step 1120, the host computer initiates a transmission carrying the user data to the UE. The transmission may pass via the base station, in accordance with the teachings of the embodiments described throughout this disclosure. In an optional third step 1130, the UE receives the user data carried in the transmission.

In any aspect, the technique may comprise, alone or in combination with the embodiments disclose herein, a method for determining which spatial domain, e.g., receiver beam and/or how to combine antenna elements, to use for e.g., RSSI measurements. The method may be based on that the radio device, e.g., the UE, such as the radio device 100, determines a spatial quasi-co-location (QCL) reference as the spatial domain and then measures e.g., the RSSI with a spatial receiver filter according to that reference. A number of different references and ways to configure the UE, such as e.g., the radio device 100, are outlined in the different embodiments.

As has become apparent from above description, at least some embodiments of the technique allow for defining or improving the definition, e.g., the configuration and/or the underlying signaling, for a directivity of the, e.g., RSSI or CO, measurements. The network node, e.g., a gNB, such as the network node 200, may make informed decisions on expected interference conditions. This will help the gNB, such as e.g., the network node 200, in it dynamic channel selection, scheduling and mobility decisions optimizing the user and system performance.

As to a first method aspect, a method of measuring a received signal strength by a radio device in a radio access network (RAN) is provided.

The first method aspect may be implemented alone or in combination with any one of the embodiments disclosed herein, e.g., in the list of embodiments, particularly the embodiments 1 to 79.

The technique may be implemented as a method of performing directional (e.g., RSSI) measurements and/or Channel Occupancy (CO) measurements. The measurements may be performed in a NR system and/or unlicensed spectrum (e.g., NR-U)

The radio resource information may be implicitly signaled from the RAN the radio device. The radio resource information may be indicative of the spatial domain for the (e.g., RSSI or Channel Occupancy) measurement based on a beam (e.g., a received reference signal from the RAN) and/or one or more transmission configuration indicators (TCIs) configured by the RAN at the radio device.

The measurements may be performed in NR operation and/or in mm-wave bands, and/or for the scheduling of the RAN in NR operation and/or in mm-wave bands.

Embodiments of the technique determine how to define the spatial domain of the radio resource, e.g., how to combine the signal from different antenna elements and/or in which direction to measure based on the obtained radio resource information.

The first aspect may be implemented as a method for directional received signal strength indicator (RSSI) measurements at the radio device. Several different embodiments, which are combinable, for implicit and/or explicit configuration of the radio device are disclosed.

As to a second method aspect, a method of a method of receiving a received signal strength measured by a radio device in a radio access network (RAN) is provided.

The second method aspect may be implemented alone or in combination with any one of the embodiments disclosed herein, e.g., in the list of embodiments, particularly the embodiments 80 to 89.

The second method aspect may further comprise any feature and/or any step disclosed in the context of the first method aspect, or a feature and/or step corresponding thereto, e.g., a receiver counterpart to a transmitter feature or step.

The radio device and/or the network node and/or the RAN may form, or may be part of, a radio network, e.g., according to the Third Generation Partnership Project (3GPP) or according to the standard family IEEE 802.11 (Wi-Fi). The first method aspect may be performed by one or more embodiments of the radio device. The second method aspect may be performed by one or more embodiments of the radio devices.

The RAN may comprise one or more base stations (e.g., the network node), e.g., performing the second method aspect. Alternatively or in addition, the radio network may be a vehicular, ad hoc and/or mesh network comprising two or more radio devices, e.g., acting as the radio device and/or the network node.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more base stations (e.g., network nodes) and/or one or more cells (e.g., associated with one or more base stations). Any network node may be implemented by an evolved Node B (eNodeB or eNB) or a Fifth Generation NodeB (gNodeB or gNB).

The radio device may be wirelessly connected or connectable (e.g., according to a radio resource control, RRC, state or active mode) with the RAN and, optionally, at least one base station of the RAN.

The base station may encompass any station that is configured to provide radio access to any of the radio devices. The base stations may also be referred to as cell, transmission and reception point (TRP), radio access node or access point (AP). The base station and/or the relay radio device may provide a data link to a host computer providing the user data to the remote radio device or gathering user data from the remote radio device. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for measuring a received signal strength measured by a radio device in a radio access network (RAN) is provided.

The device may be configured to perform any one of the steps of the first method aspect.

As to a further first device aspect, a device for measuring a received signal strength measured by a radio device in a radio access network (RAN) is provided. The device comprises processing circuitry (e.g., at least one processor and a memory). Said memory comprises instructions executable by said at least one processor whereby the device is operative to perform any one of the steps of the first method aspect.

The first device aspects may be implemented alone or in combination with any one of the embodiments disclosed herein, e.g., in the list of embodiments, particularly the embodiments 91 to 107.

As to a second device aspect, a device for receiving a received signal strength measured by a radio device in a radio access network (RAN) is provided.

The device may be configured to perform any one of the steps of the second method aspect.

As to a further second device aspect, a device for receiving a received signal strength measured by a radio device in a radio access network (RAN) is provided. The device comprises processing circuitry (e.g., at least one processor and a memory). Said memory comprises instructions executable by said at least one processor whereby the device is operative to perform any one of the steps of the second method aspect.

The second device aspects may be implemented alone or in combination with any one of the embodiments disclosed herein, e.g., in the list of embodiments, particularly the embodiments 91 to 107.

As to a still further aspect a communication system including a host computer is provided. The host computer comprises a processing circuitry configured to provide user data, e.g., included in the first and/or second data of the multi-layer transmission. The host computer further comprises a communication interface configured to forward the first and/or second data to a cellular network (e.g., the RAN and/or the base station) for transmission to a UE. A processing circuitry of the cellular network is configured to execute any one of the steps of the first and/or second method aspects. The UE comprises a radio interface and processing circuitry, which is configured to execute any one of the steps of the first and/or second method aspects.

The communication system may further include the UE. Alternatively, or in addition, the cellular network may further include one or more base stations configured for radio communication with the UE and/or to provide a data link between the UE and the host computer using the first and/or second method aspects.

The processing circuitry of the host computer may be configured to execute a host application, thereby providing the first and/or second data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

Many advantages of the embodiments herein will be fully understood from the foregoing description, and it will be apparent that various changes may be made in the form, construction and arrangement of the units and devices without departing from the scope of the embodiments herein and/or without sacrificing all of its advantages. Since embodiments herein may be varied in many ways, it will be recognized that the embodiments herein should be limited only by the scope of the following claims.

List of Embodiments

1. A method (300) of measuring a received signal strength by a radio device in a radio access network, RAN, the method (300) comprising or initiating the steps of:
   obtaining (302) a radio resource information indicative of a spatial domain of a radio resource for measuring the received signal strength; and
   measuring (304) the received signal strength on the radio resource in the spatial domain according to the obtained (302) radio resource information.
   The radio resource information may be obtained at the radio device. The step of obtaining may comprise receiving, deriving and/or determining the radio resource information. Obtaining the radio resource information may be referred to, or may be part of, a configuration of the radio device.

2. The method (300) of embodiment 1, wherein the spatial domain corresponds to at least one of
   a spatial direction relative to the radio device;
   a directivity of the measurement (304); and
   a beam formed at the radio device, optionally a receiver beam and/or a transmitter beam.

3. The method (300) of embodiment 1 or 2, wherein the radio device comprise a plurality of antenna elements, optionally arranged in an antenna array.
   The antenna array may be one or two dimensional. The antenna array may correspond to (e.g., finite section of) a lattice, e.g., a Bravais lattice or a rectangular or hexagonal lattice. The (e.g., Bravais) lattice may be spanned by one or more base vectors according to the dimensionality of the antenna array. The base vectors may or may not be orthogonal.
   Alternatively or in addition, the antenna elements may be arranged in different orientation, e.g., corresponding to different polarizations of electromagnetic radiations received at and/or transmitted from the respective antenna element 4. The method (300) of any one of embodiments 1 to 3, wherein the antenna elements are used for at least one of the obtaining (302) of the radio resource configuration indicative of the spatial radio resource and the measurement (304) of the received signal strength on the radio resource configuration in the spatial direction.

5. The method (300) of embodiment 3 or 4, wherein the spatial domain of the radio resource corresponds to a combination of the antenna elements according to a spatial domain filter.
   The spatial domain filter may also be referred to as a spatial precoder. The spatial domain filter may correspond to and/or may be implemented by a set of (e.g., receive and/or transmit) beamforming weights. The beamforming weights may also be referred to as antenna weighting factors.

6. The method (300) of any one of embodiments 1 to 5, wherein the obtaining (302) of the radio resource information indicative of the spatial domain comprises implicitly receiving the radio resource information from the RAN, optionally from a cell (502) or network node serving the radio device.

7. The method (300) of any one of embodiments 1 to 6, wherein the measurement (304) on the radio resource comprises a total received power, and/or wherein the measurement (304) is indifferent as to sources of the received signal strength.
   The received signal strength may comprise the received power from all sources on the radio resource in the spatial domain, e.g., including at least one of one or more co-channel serving cells, one or more non-serving cells, adjacent channel interference, and thermal noise.

8. The method (300) of any one of embodiments 1 to 7, performed by the radio device configured for radio access in the RAN.

9. The method (300) of any one of embodiments 1 to 8, further comprising or initiating the step of:
   determining (306) a function of the received signal strength.

10. The method (300) of any one of embodiments 1 to 9, further comprising or initiating the step of:
    transmitting (308) a report to the RAN, the report being indicative of the received signal strength or the function of the received signal strength.

11. The method (300) of embodiment 10, wherein the report is configured by radio resource control, RRC, signaling from the RAN.
    The report may be configured by an information element (IE) MeasResults and/or a parameter measResultForRSSI, particularly measResultForRSSI-r13 or measResultForRSSI-NR-r16, e.g., according to the 3GPP document TS 36.331, version 16.2.1.

12. The method (300) of any one of embodiments 1 to 11, wherein the received signal strength or the determined function comprises a received signal strength indicator, RSSI.

13. The method (300) of embodiment 12, wherein the RSSI is a linear average of the received signal strength on the radio resource in the spatial domain, optionally averaged over at least one of a time domain and a frequency domain.
    The RSSI may comprise a linear average of the total received power (e.g., in Watt) observed in the time domain (e.g., only per configured OFDM symbol) and/or in the frequency domain (e.g., in the measurement bandwidth corresponding to the channel bandwidth defined in Clause 4 of the 3GPP document TS 37.213, version 16.3.0). In the frequency domain, the channel may have the center frequency configured by an Absolute Radio Frequency Channel Number (e.g., ARFCN-valueNR), e.g., as defined by the UE.

The time domain may be configured by an RSSI measurement timing configuration (RMTC). The radio resource information or a configuration message may comprise the RMTC.

14. The method (300) of any one of embodiments 1 to 13, wherein the received signal strength or the determined function comprises a channel occupancy, CO.

15. The method (300) of embodiment 14, wherein the CO corresponds to a fraction of time intervals, optionally a durations of resource blocks for modulation symbols, during which the received signal strength is greater than a threshold value.

The threshold value may be a parameter channelOccupancyThreshold according to the 3GPP document 36.331, version 16.2.1 or the 3GPP document 38.311, version 16.2.0. The CO (e.g. according to the parameter channelOccupancy) may be indicative of the percentage of samples when the RSSI was above the configured threshold value (e.g., channelOccupancyThreshold) for the associated configuration of the report (e.g., reportConfig).

16. The method (300) of any one of embodiments 1 to 15, wherein the measurement (304) comprises a cross-link interference measurement, and/or wherein the received signal strength or the determined function comprises a cross-link interference RSSI, CLI-RSSI.

17. The method (300) of any one of embodiments 1 to 16, wherein the measurement (304) is limited to the spatial domain of the radio resource information.

The received signal strength may be measured only in the spatial domain according to the radio resource information.

18. The method (300) of any one of embodiments 1 to 17, wherein the spatial domain is defined and/or used by a spatial domain filter for an antenna array of the radio device, and/or wherein the spatial domain is defined and/or used by a beamformed reception using an antenna array at the radio device.

19. The method (300) of embodiment 18, wherein the measurement (304) comprises applying the spatial domain filter to the antenna array, and/or wherein the measurement (304) is based on the beamformed reception.

20. The method (300) of any one of embodiments 1 to 19, wherein the radio resource information is obtained from a network node of the RAN.

21. The method (300) of any one of embodiments 1 to 20, wherein the radio resource information is further indicative of at least one of a time domain and a frequency domain of the radio resource for the measurement (304).

The radio resource information may be received in one or more RRC messages. The one or more RRC messages may be indicative of at least one of a time domain and a frequency domain of the radio resource for the measurement. For example, the time domain may be configured by an RSSI measurement timing configuration (RMTC).

The radio resource information may comprise an IE MeasObjectNR and/or a parameter RMTC-Config-r16, e.g., according to the 3GPP document TS 38.331, version 16.2.0.

The radio device may setup the RMTC according to the 3GPP document TS 38.331, version 16.2.0, clause 5.5.2.10a.

22. The method (300) of any one of embodiments 1 to 21, wherein the radio resource information comprises a measurement timing configuration of the measurement (304) and/or is indicative of at least one of:

a periodicity of the measurement (304);

a subframe offset of the radio resource in the time domain; and a consecutive measurement duration of the radio resource in the time domain.

23. The method (300) of any one of embodiments 1 to 22, wherein the radio resource information is further indicative of at least one of:

a frequency for the measurement (304), optionally an absolute radio frequency channel number, ARFCN; and a subcarrier spacing, SCS, and/or a length of a cyclic prefix, CP.

The measurement may be an intra-frequency measurement and/or an inter-frequency measurement, e.g., of an SSB and/or a CSI-RS.

24. The method (300) of any one of embodiments 1 to 23, wherein the radio device is served by a cell (502) or network node of the RAN on a serving cell frequency, and wherein the radio resource for the measurement (304) is on the serving cell frequency.

25. The method (300) of any one of embodiments 1 to 24, wherein the radio device is served by a cell (502) or network node of the RAN, and wherein the radio resource information is obtained by determining the spatial domain based on a reception from the cell (502) or network node.

The spatial domain for the measurement of the received signal strength may be based on the reception from the cell or network node, e.g., the reception of a physical signal or reference signal from the cell or network node.

26. The method (300) of any one of embodiments 1 to 25, wherein obtaining (302) the radio resource information comprises determining the spatial domain of the radio resource for the measurement (304) based on a reception of a reference signal of the RAN, optionally based on a reception of a synchronization signal block, SSB, and a channel state information reference signal, CSI-RS.

The SSB may comprise at least one of a synchronization signal (SS) and a physical broadcast channel (PBCH).

27. The method (300) of embodiment 25 or 26, wherein the reception from the cell (502) or network node defines a spatial domain filter that is used by the radio device for both the reception from the cell (502) or network node and the measurement (304) of the received signal strength.

28. The method (300) of any one of embodiments 1 to 27, wherein the radio device is served by a cell (502) or network node of the RAN on a serving cell frequency, and wherein the radio resource is on a frequency of a neighboring cell (504) of the serving cell (502) or serving network node and/or on a frequency other than serving cell frequency.

29. The method (300) of any one of embodiments 1 to 28, wherein a frequency domain of the radio resource for the measurement (304) is in a millimeter-wave band, and/or wherein in a frequency of the radio resource for the measurement (304) is greater than 52.6 GHz and/or less than 71 GHz, and/or wherein a frequency domain of the radio resource for the measurement (304) is in shared spectrum.

The shared spectrum may be unlicensed spectrum. For example, the shard spectrum may be shared by multiple radio access technologies (RATs) and/or used by at least one RAT not used by the RAN. Alternatively or in addition, the RAN may provide radio access to radio devices in the shared spectrum, optionally using control signaling in spectrum exclusively used by the RAN (e.g., licensed spectrum).

The received signal strength may be measured for licensed-assisted access (LAA).

30. The method (300) of any one of embodiments 1 to 29, wherein the radio device is served by the RAN on one or more receiver beams of the radio device, and wherein the measurement (302) by the radio device uses the one or more receiver beams as the spatial domain of the radio resource.

31. The method (300) of any one of embodiments 1 to 30, wherein the radio device is served by the RAN according to a transmission configuration indicator, TCI, and wherein the TCI determines the spatial domain of the radio resource for the measurement (302).

The TCI may be an active configuration indicator for the physical downlink control channel (PDCCH).

32. The method (300) of embodiment 31, wherein the radio device is in an active or connected state with the RAN.

33. The method (300) of any one of embodiments 1 to 32, wherein the radio device is in a idle or disconnected state with the RAN, and wherein a reference signal, optionally an SSB, from the RAN determines the spatial domain of the radio resource for the measurement (302).

34. The method (300) of any one of embodiments 1 to 33, wherein the obtaining (302) of the radio resource information comprises receiving one or more TCIs from the RAN, each of the one or more TCIs being indicative of the spatial domain for the measurement (304).

35. The method (300) of any one of embodiments 1 to 34, wherein the obtaining (302) of the radio resource information comprises receiving a plurality of TCIs from the RAN, and wherein the measurement (304) comprises measuring the received signal strength in the spatial domain indicated by each of the plurality of TCIs.

36. The method (300) of embodiment 34 or 35, further comprising or initiating the step of:

transmitting (308) a report to the RAN, the report being indicative of a list of the received signal strength or the function of the received signal strength for each of the plurality of TCIs.

Each TCI may be obtained and/or reported as an TCI state or TCI index of index of the TCI state.

37. The method (300) of any one of embodiments 34 to 36, further comprising or initiating the step of:

transmitting (308) a report to the RAN, the report being indicative of at least one of the lowest received signal strength among the received signal strength measured for each of the plurality of TCIs and the TCI out of the plurality of TCIs for which the received signal strength is the lowest.

Herein, lower and lowest may be equivalent to less and least (e.g., minimum).

38. The method (300) of any one of embodiments 34 to 37, further comprising or initiating the step of:

transmitting (308) a report to the RAN, the report being indicative of at least one of the highest received signal strength among the received signal strength measured for each of the plurality of TCIs, a reference signal received quality corresponding to the highest received signal strength, and the TCI out of the plurality of TCIs for which the received signal strength is the highest.

Herein, higher and highest may be equivalent to greater and greatest (e.g., maximum).

39. The method (300) of any one of embodiments 34 to 38, wherein the obtaining (302) comprises receiving, from the RAN, the one or more TCIs or a list of the plurality of TCIs in an RRC message or an RMTC or an RSSI configuration.

The list of the plurality of TCIs may be received in an RMTC-Config and/or an RSSI-ResourceConfigCLI.

40. The method (300) of any one of embodiments 34 to 39, wherein the obtaining (302) comprises receiving, from the RAN, one or more indices or a plurality of indices for a state of the respective TCI.

41. The method (300) of any one of embodiments 34 to 40, wherein the obtaining (302) comprises receiving, from the RAN, one or more configurations or a plurality of configurations for a state of the respective TCI.

42. The method (300) of any one of embodiments 1 to 41, wherein the obtaining (302) of the radio resource information comprises receiving radio resource information for one or more radio link monitoring reference signals, RLM-RSs, from the RAN, each of the one or more RLM-RSs being indicative of the spatial domain for the measurement (304).

43. The method (300) of any one of embodiments 1 to 42, wherein the obtaining (302) of the radio resource information comprises receiving radio resource information for a plurality of RLM-RSs from the RAN, and wherein the measurement (304) comprises measuring the received signal strength in the spatial domain indicated by each of the plurality of RLM-RSs.

44. The method (300) of embodiment 42 or 43, further comprising or initiating the step of:

transmitting (308) a report to the RAN, the report being indicative of a list of the received signal strength or the function of the received signal strength for each of the plurality of RLM-RSs.

45. The method (300) of any one of embodiments 42 to 44, further comprising or initiating the step of:

transmitting (308) a report to the RAN, the report being indicative of at least one of the lowest received signal strength among the received signal strength measured for each of the plurality of RLM-RSs and an index of the RLM-RS out of the plurality of RLM-RSs for which the received signal strength is the lowest.

46. The method (300) of any one of embodiments 42 to 45, further comprising or initiating the step of:

transmitting (308) a report to the RAN, the report being indicative of at least one of the highest received signal strength among the received signal strength measured for each of the plurality of RLM-RSs, a reference signal received quality corresponding to the highest received signal strength, and an index of the RLM-RS out of the plurality of RLM-RSs for which the received signal strength is the highest.

47. The method (300) of any one of embodiments 42 to 46, wherein the radio resource information for the one or more RLM-RSs or the list of the plurality of RLM-RSs is received in an RRC message or an RMTC or an RSSI configuration.

The list of the plurality of RLM-RSs may be received in an RMTC-Config and/or an RSSI-ResourceConfigCLI.

48. The method (300) of any one of embodiments 42 to 47, wherein the radio resource information for the one or more RLM-RSs or the list of the plurality of RLM-RSs comprises an index of the respective RLM-RS.

49. The method (300) of any one of embodiments 1 to 48, wherein the obtaining (302) of the radio resource information comprises receiving radio resource information for a serving cell (502) of the RAN serving the radio device, and wherein the measurement (304) comprises measuring the received signal strength in the spatial domain used to measure the serving cell (502).

50. The method (300) of any one of embodiments 1 to 49, wherein the obtaining (302) of the radio resource information comprises receiving radio resource information for one or a plurality of neighboring cells (504) of a serving cell (502) of the RAN serving the radio device, and wherein the measurement (304) comprises measuring the received signal strength in the spatial domain used to measure the one or each of the plurality of neighboring cells (504).

51. The method (300) of any one of embodiments 1 to 50, wherein the obtaining (302) of the radio resource information comprises receiving radio resource information for a serving cell (502) of the RAN serving the radio device and one or a plurality of neighboring cells (504) of the serving cell (502), and wherein the measurement (304) comprises measuring the received signal strength in the spatial domain used to measure each of the serving cell (502) and the one or the plurality of neighboring cells (504).

52. The method (300) of any one of embodiments 49 to 51, further comprising or initiating the step of:
    transmitting (308) a report to the RAN, the report being indicative of a list of the received signal strength or the function of the received signal strength for each of the serving cell (502) and/or the one or the plurality of neighboring cells (504).

53. The method (300) of any one of embodiments 49 to 52, further comprising or initiating the step of:
    transmitting (308) a report to the RAN, the report being indicative of at least one of the lowest received signal strength among the received signal strength measured for each of the cells (502; 504) and an identity of the cell (502; 504) out of the cells (502; 504) for which the received signal strength is the lowest or a corresponding measurement object identity.

54. The method (300) of any one of embodiments 49 to 53, further comprising or initiating the step of:
    transmitting (308) a report to the RAN, the report being indicative of at least one of the highest received signal strength among the received signal strength measured for each of the cells (502; 504), a reference signal received quality corresponding to the highest received signal strength, and an identity of the cell out of the plurality of cells (502; 504) for which the received signal strength is the highest or a corresponding measurement object identity.

55. The method (300) of any one of embodiments 49 to 54, wherein the radio resource information for the serving cell (502) or the one or the plurality of neighboring cells (504) is received in an RRC message or an RMTC or an RSSI configuration.

The cell identity (cell ID, or a corresponding measurement object identity) of the serving cell or the one or the plurality of neighboring cells may be received in an RMTC-Config and/or an RSSI-ResourceConfigCLI.

56. The method (300) of any one of embodiments 49 to 55, wherein the radio resource information for the serving cell (502) or the one or the plurality of neighboring cells (504) comprises an identity of the respective cell or a corresponding measurement object identity.

57. The method (300) of any one of embodiments 49 to 56, wherein multiple reference signals are used to measure (304) the serving cell (502) and/or the one or the plurality of neighboring cells (504), and wherein the measuring (304) comprises measuring the received signal strength in the spatial domain defined by each of the multiple reference signals for each of the serving cell (502) and/or the one or the plurality of neighboring cells (504).

58. The method (300) of any one of embodiments 49 to 57, wherein the report is indicative of an average of the received signal strength for each of the serving cell (502) and/or the one or the plurality of neighboring cells (504) or is indicative of the function of the average for each of the serving cell (502) and/or the one or the plurality of neighboring cells (504).
    Each average may be the (e.g., linear) average over the received signal strength measured for each of the multiple reference signals.

59. The method (300) of any one of embodiments 49 to 58, wherein the report is indicative of a maximum of the received signal strength for each of the serving cell (502) and/or the one or the plurality of neighboring cells (504) or is indicative of the function of the maximum for each of the serving cell (502) and/or the one or the plurality of neighboring cells (504).
    Each maximum may be the maximum over the received signal strength measured for each of the multiple reference signals.

60. The method (300) of any one of embodiments 49 to 59, wherein the report is indicative of the received signal strength measured for each of the multiple reference signals and for each of the serving cell (502) and/or the one or the plurality of neighboring cells (504) or is indicative of the function of the received signal strength measured for each of the multiple reference signals and for each of the serving cell (502) and/or the one or the plurality of neighboring cells (504).

61. The method (300) of any one of embodiments 49 to 60, wherein the radio resource information for the serving cell (502) and/or the one or the plurality of neighboring cells (504) is indicative of a subset of the multiple reference signals to be used for the measurement (304).

62. The method (300) of any one of embodiments 1 to 61, wherein the obtaining (302) and the measurement (304) are performed in combination by determining the spatial domain, optionally the receiver beam, that corresponds to the highest received signal strength at the radio device.

63. The method (300) of any one of embodiments 1 to 62, wherein the obtaining (302) and the measurement (304) are performed in combination by determining the spatial domain, optionally the receiver beam, that corresponds to the lowest received signal strength at the radio device.

The steps may be performed in combination by performing the steps iteratively and/or repeatedly.

64. The method (300) of any one of embodiments 1 to 63, wherein the report is indicative of at least one of the lowest received signal strength and the highest received signal strength at the radio device and/or at least one of the function of the lowest received signal strength and the function of the highest received signal strength.

65. The method (300) of any one of embodiments 1 to 64, wherein the report is further indicative of a time of the measurement (304) of the respectively reported received signal strength or the respectively reported function thereof.

66. The method (300) of any one of embodiments 1 to 65, wherein the radio device is configured to measure (304) simultaneously the received signal strength in each of multiple spatial domains.

The multiple spatial domains may correspond to the multiple reference signals, e.g., of the serving cell and/or the one or the plurality of neighboring cells.

67. The method (300) of embodiment 66, wherein the report is further indicative of at least one group of the reported received signal strengths, or the functions thereof, as being measured simultaneously.

68. The method (300) of embodiment 66 or 67, wherein the radio device transmits (308) a report for each group of the received signal strengths, or the functions thereof, that were measured simultaneously.

69. The method (300) of any one of embodiments 1 to 68, wherein the obtaining (302) and/or the measurement (304) comprises selecting at least one spatial domain at the radio device.

70. The method (300) of embodiment 69, further comprising or initiating the step of:

transmitting (308) a report to the RAN, the report being indicative of at least one of the received signal strength or the function of the received signal strength for each of the selected at least one spatial domain and an index, optionally an TCI state index, of the selected at least one spatial domain.

71. The method (300) of any one of embodiments 1 to 70, wherein the obtaining (302) of the radio resource information comprises receiving radio resource information for at least one of channel measurement and interference measurement at the radio device.

The radio resource information may be a CSI resource setting and/or defined in accordance with the 3GPP document TS 38.214, version 16.3.0, Section 5.2.1.2.

72. The method (300) of any one of embodiments 1 to 71, wherein the channel measurement is based on channel state information reference signals, CSI-RSS, and/or the radio resource information is indicative of the radio resource for the CSI-RSs.

73. The method (300) of any one of embodiments 1 to 72, wherein the interference measurement is based on channel state information interference measurement, CSI-IM, resources and/or the radio resource information is indicative of the CSI-IM resources.

74. The method (300) of any one of embodiments 1 to 73, wherein the interference measurement is based on non-zero power channel state information reference signals, NZP CSI-RS, resources and/or the radio resource information is indicative of the NZP CSI-RS resources.

75. The method (300) of embodiment 74, wherein the report is indicative of a difference between the received signal strength measured in the NZP CSI-RS resources and a portion of the received signal strength due to a serving cell (502) of the RAN in the NZP CSI-RS resources.

76. The method (300) of any one of embodiments 1 to 75, wherein the measurement (302) of received signal strength and/or the transmitting (308) of the report indicative of received signal strength or the function thereof, are periodic and/or event-triggered.

77. The method (300) of any one of embodiments 1 to 76, wherein the radio resource information or configuration information, optionally an RRC message, is indicative of whether the measurement (302) and/or the transmitting (308) of the report are periodic and/or event-triggered.

78. The method (300) of any one of embodiments 1 to 77, wherein the measurement (302) is performed by a physical layer, PHY layer, or layer 1, L1, of a protocol stack at the radio device for the radio access to the RAN.

79. The method (300) of any one of embodiments 1 to 78, wherein the measurement (302) is performed periodic or aperiodic and/or wherein the report is transmitted on a physical uplink control channel, PUCCH, of the RAN, on a physical uplink shared channel, PUSCH, of the RAN, or as part of an uplink control information, UCI, for configured-grant PUSCH transmissions.

80. A method (400) of receiving a received signal strength measured by a radio device in a radio access network, RAN, the method (400) comprising or initiating the step of:

receiving (408) a report indicative of the received signal strength measured at the radio device or a function of the received signal strength, wherein the received signal strength is measured on a radio resource in a spatial domain.

81. The method (400) of embodiment 80, further comprising or initiating the step of:

providing (410) radio access to the radio device in the RAN or one or more radio devices including the radio device in the RAN, wherein the radio access is provided based the received report.

82. The method (400) of embodiment 81, wherein providing the radio access comprises, based the received report, at least one of a channel selection for the radio or the radio devices, a scheduling of the radio device or the radio devices, and a mobility decision on the radio device or the radio devices.

83. The method (400) of any one of embodiments 80 to 82, further comprising or initiating the step of:

providing (402) a radio resource information indicative of a spatial domain of a radio resource for measuring the received signal strength; and 84. The method (400) of embodiment 83, wherein the radio resource information is unicasted, uses dedicated signaling, is multicast, or broadcast, optionally in system information, SI.

85. The method (400) of any one of embodiments 80 to 84, wherein the RAN serves the radio device according to one or more transmission configuration indicators, TCIs, and wherein at least one or each of the one or more TCIs determines the spatial domain of the radio resource for the measurement at the radio device.

86. The method (400) of any one of embodiments 80 to 85, wherein the RAN transmits one or more reference signals, and wherein at least one or each of the one or more reference signals determines the spatial domain of the radio resource for the measurement at the radio device.

87. The method (400) of any one of embodiments 80 to 86, wherein a frequency domain of the radio resource for the measurement of the received signal strength is different from a serving cell frequency providing radio access to the radio device, and wherein the radio access provided to the radio devices uses the different frequency for the radio device depending on and/or responsive to the report.

88. The method (400) of any one of embodiments 80 to 87, performed by the RAN or a network node of the RAN, optionally by a network node or cell of the RAN serving the radio device.

89. The method (400) of any one of embodiments 80 to 88, further comprising the features or steps of any one of embodiments 1 to 79 or any feature or step corresponding thereto.

90. A computer program product comprising program code portions for performing the steps of any one of the embodiments 1 to 79, and/or any one of the embodiments 80 to 89 when the computer program product is executed on one or more computing devices (1104; 1204), optionally stored on a computer-readable recording medium (1106; 1206).

91. A radio device (100) comprising memory operable to store instructions and processing circuitry operable to execute the instructions, such that the radio device (100) is operable to:
obtain (302) a radio resource information indicative of a spatial domain of a radio resource for measuring a received signal strength; and
measure (304) the received signal strength on the radio resource in the spatial domain according to the obtained (302) radio resource information.

92. The radio device (100; 1100; 1291; 1292; 1330) of embodiment 91, further operable to perform the steps of any one of embodiments 2 to 79.

93. A radio device (100) for measuring a received signal strength by the radio device (100) in a radio access network, RAN, the radio device (100) being configured to:
obtain (302) a radio resource information indicative of a spatial domain of a radio resource for measuring a received signal strength; and
measure (304) the received signal strength on the radio resource in the spatial domain according to the obtained (302) radio resource information.

94. The radio device (100; 1100; 1291; 1292; 1330) of embodiment 93, further configured to perform the steps of any one of embodiments 2 to 79.

95. A user equipment, UE, (100; 1100; 1391; 1392; 1430) configured to communicate with a base station (200; 1200; 1312; 1420) of a RAN, the UE (100; 1100; 1391; 1392; 1430) comprising a radio interface (1102; 1437) and processing circuitry (1104; 1438) configured to:
obtain (302) a radio resource information indicative of a spatial domain of a radio resource for measuring a received signal strength; and
measure (304) the received signal strength on the radio resource in the spatial domain according to the obtained (302) radio resource information.

96. The UE (100; 1100; 1391; 1392; 1430) of embodiment 94, wherein the processing circuitry (1104; 1438) is further configured to execute the steps of any one of embodiments 2 to 79.

97. A network node (200) comprising memory operable to store instructions and processing circuitry operable to execute the instructions, such that the network node (200) is operable to:
obtain (302) a radio resource information indicative of a spatial domain of a radio resource for measuring a received signal strength; and
measure (304) the received signal strength on the radio resource in the spatial domain according to the obtained (302) radio resource information.

98. The network node (200) of embodiment 96, further operable to perform any one of the steps of any one of embodiments 80 to 89.

99. A network node (200) for receiving a received signal strength measured by a radio device in a radio access network, RAN, configured to
receive (408) a report indicative of the received signal strength measured at the radio device or a function of the received signal strength, wherein the received signal strength is measured on a radio resource in a spatial domain.

100. The network node (200) of embodiment 98, further configured to perform the steps of any one of embodiment 80 to 89.

101. A base station (200; 1200; 1312; 1420) configured to communicate with a user equipment, UE, the base station (200; 1200; 1312; 1420) comprising a radio interface (1202; 1427) and processing circuitry (1204; 1428) configured to:
receive (408) a report indicative of a received signal strength measured at the radio device or a function of the received signal strength, wherein the received signal strength is measured on a radio resource in a spatial domain.

102. The base station (200; 1200; 1312; 1420) of embodiment 100, wherein the processing circuitry (1204; 1428) is further configured to execute the steps of any one of embodiments 80 to 89.

103. A communication system (1300; 1400) including a host computer (1330; 1410) comprising:
processing circuitry (1418) configured to provide user data; and
a communication interface (1416) configured to forward user data to a cellular or ad hoc radio network (1310) for transmission to a user equipment, UE, (100; 1100; 1391; 1392; 1430) wherein the UE (100; 1100; 1391; 1392; 1430) comprises a radio interface (1102; 1437) and processing circuitry (1104; 1438), the processing circuitry (1104; 1438) of the UE (100; 1100; 1391; 1392; 1430) being configured to execute the steps of any one of embodiments 1 to 79.

104. The communication system (1300; 1400) of embodiment 102, further including the UE (100; 1100; 1391; 1392; 1430).

105. The communication system (1300; 1400) of embodiment 102 or 103, wherein the radio network (1310) further comprises a base station (200; 1200; 1312; 1420), or a radio device (100; 1100; 1391; 1392; 1430) functioning as a gateway, which is configured to communicate with the UE (100; 1100; 1391; 1392; 1430).

106. The communication system (1300; 1400) of embodiment 104, wherein the base station (200; 1200; 1312; 1420), or the radio device (100; 1100; 1391; 1392;

1430) functioning as a gateway, comprises processing circuitry (1204; 1428), which is configured to execute the steps of embodiment 80 to 89.

107. The communication system (1300; 1400) of any one of embodiments 102 to 106, wherein:

the processing circuitry (1418) of the host computer (1330; 1410) is configured to execute a host application (1412), thereby providing the user data; and the processing circuitry (1104; 1438) of the UE (100; 1100; 1391; 1392; 1430) is configured to execute a client application (1432) associated with the host application (1412).

The invention claimed is:

1. A method of measuring a received signal strength by a radio device in a radio access network, RAN, the method comprising or initiating the steps of:

obtaining a radio resource information indicative of a spatial domain of a radio resource for measuring the received signal strength, the spatial domain of the radio resource corresponding to a combination of antenna elements in the radio device according to a spatial domain filter;

measuring the received signal strength on the radio resource in the spatial domain according to the obtained radio resource information;

transmitting a report to the RAN, the report being indicative of the received signal strength, the received signal strength comprising a received signal strength indicator, RSSI;

one of both the obtaining and the measuring comprising selecting at least one spatial domain at the radio device; and the report being indicative of the received signal strength for each of the selected at least one spatial domain and a TCI state index of the selected at least one spatial domain.

2. The method of claim 1, comprising any one or more of:

wherein the obtaining of the radio resource information indicative of the spatial domain comprises implicitly receiving the radio resource information from the RAN, optionally from a cell or network node serving the radio device; and wherein the radio resource information is obtained from a network node of the RAN; and wherein the radio resource information is obtained from a network node of the RAN via unicast, dedicated signaling, multicast, or broadcast, in system information, SI.

3. The method of claim 1, wherein the radio resource information is further indicative of at least one of a time domain and a frequency domain of the radio resource for the measurement.

4. The method of claim 1, comprising any one or more of:

wherein the radio device is served by a cell or network node of the RAN, and wherein the radio resource information is obtained by determining the spatial domain based on a reception from the cell or network node; and wherein obtaining the radio resource information comprises determining the spatial domain of the radio resource for the measurement based on a reception of a reference signal of the RAN, based on a reception of a synchronization signal block, SSB, and a channel state information reference signal, CSI-RS.

5. The method of claim 4, wherein the reception from the cell or network node defines a spatial domain filter that is used by the radio device for both the reception from the cell or network node and the measurement of the received signal strength.

6. The method of claim 1, wherein the radio device is served by the RAN according to a transmission configuration indicator, TCI, and wherein the TCI determines the spatial domain of the radio resource for the measurement.

7. The method of claim 1, wherein the obtaining of the radio resource information comprises receiving any one or more out of:

one or more TCIs from the RAN, each of the one or more TCIs being indicative of the spatial domain for the measurement; and radio resource information for one or more radio link monitoring reference signals, RLM-RSs, from the RAN, each of the one or more RLM-RSs being indicative of the spatial domain for the measurement.

8. The method of claim 1, wherein the obtaining of the radio resource information comprises any one or more of:

receiving a plurality of TCIs from the RAN, and wherein the measurement comprises measuring the received signal strength in the spatial domain indicated by each of the plurality of TCIs; and receiving radio resource information for a plurality of RLM-RSs from the RAN, and wherein the measurement comprises measuring the received signal strength in the spatial domain indicated by each of the plurality of RLM-RSs.

9. The method of claim 1, wherein the obtaining and the measurement are performed in combination by determining the spatial domain, optionally the receiver beam, that corresponds to any one or more of:

the highest received signal strength at the radio device; and the lowest received signal strength at the radio device;

and wherein the report is indicative of at least one of the lowest received signal strength and the highest received signal strength at the radio device.

10. The method of claim 1, wherein the obtaining of the radio resource information comprises receiving radio resource information for at least one of channel measurement and interference measurement at the radio device, wherein any one or more of:

one or both the channel measurement is based on channel state information reference signals, CSI-RSs, and the radio resource information is indicative of the radio resource for the CSI-RSs; and one or both the interference measurement is based on channel state information interference measurement, CSI-IM, resources and the radio resource information is indicative of the CSI-IM resources; and wherein the report comprises any one or more of:

a channel quality indicator, CQI, based on the channel measurement and the interference measurement; and the interference measurement, wherein the interference measurement is reported without combining in it with the channel measurement.

11. A method of receiving a received signal strength measured by a radio device in a radio access network, RAN, the method comprising or initiating the step of:

receiving a report indicative of the received signal strength measured at the radio device, wherein the received signal strength is measured on a radio resource in the spatial domain, the received signal strength comprising a received signal strength indicator, RSSI; and providing radio access to the radio device in the RAN or one or more radio devices including the radio device in the RAN, the radio access being provided based the received report;

the report being indicative of at least one of the received signal strength for each of the selected at least one spatial domain and a TCI state index of the selected at least one spatial domain.

12. The method of claim 11, further comprising or initiating the step of:

providing a radio resource information indicative of a spatial domain of a radio resource for measuring the received signal strength.

13. The method of claim 11, wherein the RAN serves the radio device according to one or more transmission configuration indicators, TCIs, and wherein at least one or each of the one or more TCIs determines the spatial domain of the radio resource for the measurement at the radio device.

14. The method of claim 11, wherein the RAN transmits one or more reference signals, and wherein at least one or each of the one or more reference signals determines the spatial domain of the radio resource for the measurement at the radio device.

15. A radio device for measuring a received signal strength by the radio device in a radio access network, RAN, the radio device being configured to:

obtain a radio resource information indicative of a spatial domain of a radio resource for measuring a received signal strength, the spatial domain of the radio resource being configured to correspond to a combination of antenna elements in the radio device according to a spatial domain filter;

measure the received signal strength on the radio resource in the spatial domain according to the obtained radio resource information;

transmit a report to the RAN, the report adapted to be indicative of the received signal strength, the received signal strength comprising a received signal strength indicator, RSSI;

one of both the obtaining and the measuring comprising selecting at least one spatial domain at the radio device; and the report being indicative of the received signal strength for each of the selected at least one spatial domain and a TCI state index of the selected at least one spatial domain.

16. The radio device of claim 15, configured to any one or more of:

obtain the radio resource information indicative of the spatial domain by implicitly receiving the radio resource information from the RAN, from a cell or network node serving the radio device;

wherein the radio resource information is configured to be obtained from a network node of the RAN; and wherein the radio resource information is configured to be obtained from a network node of the RAN via unicast, dedicated signaling, multicast, or broadcast, optionally in system information, SI.

17. The radio device of claim 15, wherein the radio resource information is configured to further be indicative of at least one of a time domain and a frequency domain of the radio resource for the measurement.

18. The radio device of claim 15, comprising any one or more of:

being configured to be served by a cell or network node of the RAN, and the radio resource information being configured to be obtained by determining the spatial domain based on a reception from the cell or network node; and being further configured to obtain the radio resource information by determining the spatial domain of the radio resource for the measurement based on a reception of a reference signal of the RAN, based on a reception of a synchronization signal block, SSB, and a channel state information reference signal, CSI-RS.

19. A network node for receiving a received signal strength measured by a radio device in a radio access network, RAN, the network node configured to:

receive a report indicative of the received signal strength measured at the radio device, the received signal strength being measured on a radio resource in a spatial domain, the received signal strength comprising a received signal strength indicator, RSSI; and provide radio access to the radio device in the RAN or one or more radio devices including the radio device in the RAN, the radio access being configured to be provided based the received report;

the report being indicative of at least one of the received signal strength for each of the selected at least one spatial domain and a TCI state index of the selected at least one spatial domain.

* * * * *